United States Patent
Sinha et al.

(10) Patent No.: US 11,514,642 B2
(45) Date of Patent: Nov. 29, 2022

(54) METHOD AND APPARATUS FOR GENERATING TWO-DIMENSIONAL IMAGE DATA DESCRIBING A THREE-DIMENSIONAL IMAGE

(71) Applicant: PURDUE RESEARCH FOUNDATION, West Lafayette, IN (US)

(72) Inventors: Ayan Tuhinendu Sinha, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 471 days.

(21) Appl. No.: 16/338,881

(22) PCT Filed: Oct. 6, 2017

(86) PCT No.: PCT/US2017/055609
§ 371 (c)(1),
(2) Date: Apr. 2, 2019

(87) PCT Pub. No.: WO2018/067978
PCT Pub. Date: Apr. 12, 2018

(65) Prior Publication Data
US 2021/0295594 A1    Sep. 23, 2021

Related U.S. Application Data

(60) Provisional application No. 62/405,908, filed on Oct. 8, 2016.

(51) Int. Cl.
*G06T 17/00*        (2006.01)
*G06T 15/10*        (2011.01)
(Continued)

(52) U.S. Cl.
CPC ............... *G06T 17/00* (2013.01); *G06N 3/04* (2013.01); *G06N 3/08* (2013.01); *G06T 15/10* (2013.01); *G06T 2215/06* (2013.01)

(58) Field of Classification Search
CPC ......... G06T 19/00; G06T 17/20; G06T 17/00; G06T 15/10; G06T 15/00; G06T 11/001;
(Continued)

(56) References Cited

U.S. PATENT DOCUMENTS 5,448,687 A    9/1995  Hoogerhyde et al.
6,668,091 B1   12/2003 Kim et al.
(Continued)

OTHER PUBLICATIONS

Raviv, D. et al., Volumetric Heat Kernel Signatures, In Proceedings of the ACM Workshop on 3D Object Retrieval, Oct. 25, 2010, pp. 1-6, New York, NY, http://www.cs.technoin.ac.il/-ron/PAPERS/Conference/RavBroBroKim3DOR2010.pdf.
(Continued)

*Primary Examiner* — Todd Buttram
(74) *Attorney, Agent, or Firm* — Purdue Research Foundation

(57) ABSTRACT

A method using a two-dimensional (2D) image representation of three-dimensional (3D) geometric objects in a machine learning framework has been developed. The method includes generating a single 2D geometry image corresponding to a 3D object model, and providing the single geometry image as input to a shape analysis task to enable shape analysis of the 3D object model based only on information encoded in the single 2D geometry image in the machine learning framework.

20 Claims, 12 Drawing Sheets

(51) Int. Cl.
*G06N 3/08* (2006.01)
*G06N 3/04* (2006.01)

(58) Field of Classification Search
CPC ... G06T 15/04; G06T 15/005; G06F 9/44458; G09G 5/363
See application file for complete search history.

(56) References Cited

U.S. PATENT DOCUMENTS

| | | | |
|---|---|---|---|
| 7,586,488 | B2 | 9/2009 | Sander et al. |
| 8,405,659 | B2 | 3/2013 | Lakshmanan et al. |
| 8,411,090 | B2 | 4/2013 | Wang |
| 9,135,750 | B2 | 9/2015 | Schmidt |
| 9,245,355 | B2 | 1/2016 | Cai et al. |
| 2006/0039600 | A1* | 2/2006 | Solem ............ G06K 9/00281 382/154 |
| 2006/0267978 | A1 | 11/2006 | Litke et al. |
| 2009/0123088 | A1 | 5/2009 | Kallay et al. |
| 2010/0085353 | A1 | 4/2010 | Zhou et al. |
| 2013/0230211 | A1* | 9/2013 | Tanabiki ............ G06V 40/23 382/103 |
| 2013/0297058 | A1 | 11/2013 | Griffith et al. |
| 2016/0078314 | A1* | 3/2016 | Nagayoshi .......... G06F 16/5838 382/209 |
| 2016/0117587 | A1* | 4/2016 | Yan ................ G06N 3/0454 706/20 |

OTHER PUBLICATIONS

International Search Report in related PCT Application No. PCT/US2017/055609, dated Dec. 29, 2017.
Boscaini, D. et al., Learning class-specific descriptors for deformable shapes using localized spectral convolutional networks, In Computer Graphics Forum, 2015, pp. 13-23, vol. 34, No. 5.
Bronstein, A. M. et al., Shape google: Geometric words and expressions for invariant shape retrieval, ACM Transactions on Graphics (TOG), 2011, vol. 30.
Chen, D.-Y. et al., On visual similarity based 3d model retrieval, Computer Graphics Forum, 2003, pp. 223-232, vol. 22, No. 3.
Desbrun, M. et al., Intrinsic Parameterizations of Surface Meshes, Computer Graphics Forum, 2002, vol. 21.
Dominitz, A. and A. Tannenbaum, Texture mapping via optimal mass transport, IEEE Transactions on Visualization and Computer Graphics, May 2010, pp. 419-433, vol. 16 No. 3.
Fang, Y. et al., 3d deep shape descriptor, In Proceedings of the IEEE Conference on Computer Vision and Pattern Recognition, 2015, pp. 2319-2328.
Floater, M. S. and K. Hormann, Surface parameterization: a tutorial and survey, In In Advances in Multiresolution for Geometric Modelling, 2005, pp. 157-186, Springer.
Friedel, I. et al., Unconstrained spherical parameterization, J. Graphics Tools, 2007, pp. 17-26, vol. 12 No. 1.
Girshick, R. et al., Rich feature hierarchies for accurate object detection and semantic segmentation, In Computer Vision and Pattern Recognition (CVPR), 2014 IEEE Conference, 2014, pp. 580-587, IEEE.
Gotsman, C. et al., Fundamentals of spherical parameterization for 3d meshes, In proceedings of the 2006 Symposium on Interactive 3D Graphics and games, 2006, pp. 28-29, 2003.
Gu, X. et al., Geometry images, In Proceedings of the 29th Annual Conference on Computer Graphics and Interactive Techniques, SIGGRAPH, 2002, pp. 355-361, New York, NY, USA, ACM.
Gu, X. et al., Genus zero surface conformal mapping and its application to brain surface mapping, In IEEE Trans. Medical Imaging, 2003.

Karpathy, A. et al., Large-scale video classification with convolutional neural networks, In Proceedings of International Computer Vision and Pattern Recognition (CVPR 2014), 2014.
Kazhdan, M. et al., Poisson surface reconstruction, In Proceedings of the Fourth Eurographics Symposium on Geometry Processing, SGP 2006, pp. 61-70, Aire-la-Ville, Switzerland, Switzerland, Eurographics Association.
Kazhdan, M. et al., Rotation invariant spherical harmonic representation of 3d shape descriptors, Jun. 14, 2003.
Krizhevsky, A. et al., Imagenet classification with deep convolutional neural networks, In F. Pereira, C. Burges, L. Bottou, and K. Weinberger, editors. Advances in Neural Information Processing Systems 25, 2012, pp. 1097-1105.
Laga, H. et al., Shrec11 track: Shape retrieval on non-rigid 3d, 2011.
Lévy, B. et al., Least squares conformal maps for automatic texture atlas generation, ACM Trans. Graph., Jul. 2002, pp. 362-371, vol. 21, No. 3.
Masci, J. et al., Shapenet: Convolutional neural networks on non-euclidean manifolds, arXiv preprint arXiv: 1501.06297, 2015.
Maturana, D. and S. Scherer, Voxnet: A 3D convolutional neural network for real-time object recognition, Signal Processing Letters, 2015.
Novotni, M. and R. Klein, Shape retrieval using 3d zernike descriptors, Computer Aided Design, 2004, pp. 1047-1062, vol. 36.
Praun, E. and H. Hoppe, Spherical parametrization and remeshing, In ACM Transactions on Graphics (TOG), 2003, pp. 340-349, vol. 22, ACM.
Rustamov, R. M., Laplace-beltrami eigenfunctions for deformation invariant shape representation, In Proceedings of the Fifth Eurographics Symposium on Geometry Processing, SGP 2007, pp. 225-233, Aire-la-Ville, Switzerland.
Shen, L. and F. Makedon, Spherical mapping for processing of 3d closed surfaces, Image and Vision Computing, 2006, pp. 743-761, vol. 24, No. 7.
Shi, B. et al., Deeppano: Deep panoramic representation for 3-D shape recognition, Signal Processing Letters, IEEE, 2015, pp. 2339-2343, vol. 22, No. 12.
Sinha, A. et al., Deephand: Robust hand pose estimation by completing a matrix imputed with deep features, In The IEEE Conference on Computer Vision and Pattern Recognition (CVPR), Jun. 2016.
Sinha, A. and K. Ramani, Multi-scale kernels using random walks, Computer Graphics Forum, 2014, pp. 164-177, vol. 33, No. 1.
Solomon, J. et al., Convolutional wasserstein distances: Efficient optimal transportation on geometric domains, ACM Transactions on Graphics, Proc. SIGGRAPH, 2015.
Su, H. et al., Multi-view convolutional neural networks for 3d shape recognition, In Proc. ICCV, 2015.
Sun, J. et al., A concise and provably informative multi-scale signature based on heat diffusion, In Proceedings of the Symposium on Geometry Processing, SGP, 2009, pp. 1383-1392, Aire-la-Ville, Switzerland.
Wu, Z. et al., 3d shapenets: A deep representation for volumetric shapes, In Proceedings of the IEEE Conference or Computer Vision and Pattern Recognition, 2015, pp. 1912-1920.
Yu, Y. et al., Mesh editing with poisson-based gradient field manipulation, ACM Trans. Graph., Aug. 2004, pp. 644-651, vol. 23, No. 3.
Zhao, X. et al., Area-preservation mapping using optimal mass transport, Visualization and Computer Graphics, IEEE Transactions on, 2013, pp. 2838-2847, vol. 19, No. 12.
Zou, G. et al., Authalic parameterization of general surfaces using lie advection, Visualization and Computer Graphics, IEEE Transactions on, 2011, pp. 2005-2014, vol. 17, No. 12.
Kim, V. et al., Blended intrinsic maps, ACM Trans. Graph, Jul. 2011, 12 pages, vol. 30, No. 4, Article 79.
Sinha, A. et al., Deep Learning 3D shape surfaces using geometry image, Proceedings of European Conference of Computer Vision, Oct. 2016, Amsterdam, Netherlands.

* cited by examiner

METHOD AND APPARATUS FOR GENERATING TWO-DIMENSIONAL IMAGE DATA DESCRIBING A THREE-DIMENSIONAL IMAGE

CLAIM OF PRIORITY

This present application is a national stage entry under 35 U.S.C. § 371(b) of International Application No. PCT/US2017/055609, filed on Oct. 6, 2017, which relates to and claims the benefit of U.S. Provisional Application No. 62/405,908, which is entitled "Method and Apparatus for Generating 2D Image Data Describing a 3D Image," and was filed on Oct. 8, 2016, the entire contents of which are hereby incorporated herein by reference.

GOVERNMENT LICENSE RIGHTS

This invention was made with government support under Contract No. CMMI1329979 awarded by the National Science Foundation. The government has certain rights in the invention.

FIELD

This disclosure relates generally to the fields of computer modeling and machine learning and, more particularly, to machine learning frameworks that analyze three-dimensional objects.

BACKGROUND

The ground-breaking accuracy obtained by convolutional neural networks (CNNs) for image classification marked the advent of machine learning methods for various vision tasks such as video recognition, human and hand pose tracking using three-dimensional (3D) sensors, image segmentation and retrieval. Prior art research attempts to adapt the CNN architecture for 3D non-rigid as well as rigid shape analysis. The lack of a unified shape representation has led researchers pursuing deformable and rigid shape analysis using machine learning down different routes.

One prior art strategy for learning a rigid shape represents the shape as a probability distribution on a 3D voxel grid. As known in the art, voxels or "volumetric pixels" provide one technique to describe the structure of a three-dimensional object that forms the basis for machine learning using the CNNs in a training process and for later recognition of similar 3D objects using the previously trained CNNs in an inferencing process. Other approaches quantify some measure of local or global variation of surface coordinates relative to a fixed frame of reference instead of directly relying upon the three-dimensional shape of the object. These representations based on voxels or surface coordinates are extrinsic to the shape, and can successfully learn shapes for classification or retrieval tasks under rigid transformations (rotations, translations and reflections). However, they will naturally fail to recognize isometric deformation of a shape, such as, for example, the deformation of the shape of a standing person when changing to a sitting position. Invariance to isometry is a necessary property for robust non-rigid shape analysis. This is substantiated by the popularity of the intrinsic shape signatures for 3D deformable shape analysis in the geometry community. Hence, CNN-based deformable shape analysis methods propose the use of geodesic convolutional filters as patches or model spectral-CNNs using the eigen decomposition of the Laplace-Beltrami operator to derive robust shape descriptors. In summary, the vision community has focused on extrinsic representation of 3D shapes suitable for learning rigid shapes, whereas the geometry community has focused on adapting CNNs to non-Euclidean manifolds using intrinsic shape properties for creating optimal descriptors. A method to unify these two complementary approaches has remained elusive.

Known CNN architectures operate primarily on planar structures. This presents a challenge for 3D model objects. The traditional approach to create a planar surface parameterization is to first cut the surface into disk-like charts, then piecewise parameterize the charts in the plane followed by stitching them together into a texture atlas that is effectively a set of standard two-dimensional pictures of a three-dimensional object taken from different angles and combined into a single large two-dimensional image. This approach fails to preserve the connectivity between different surfaces, which is, vital for holistic shape analysis. Consequently, improvements to three-dimensional data processing and machine learning that enable improved object classification of both rigid and non-rigid three-dimensional objects would be beneficial.

SUMMARY

The present disclosure provides a 3D shape representation that serves to learn rigid as well as non-rigid objects using intrinsic or extrinsic descriptors input to standard convolutional neural networks (CNNs). Machine learning frameworks that use CNNs are also known as "deep" learning frameworks since the CNNs include multiple hidden layers in the neural network structure and in some embodiments include multiple sets of CNNs that are connected together for image analysis. Instead of adapting the CNN architecture to support convolution on surfaces, the approach disclosed herein molds the 3D shape surface to fit a planar structure as required by CNNs. In particular, a method disclosed herein produces a planar parameterization by introducing a method to transform a general mesh model into a flat and completely regular 2D grid, which is referenced herein as a "geometry image". The traditional prior art approach to create a geometry image has critical limitations for learning 3D shape surfaces. The method disclosed herein uses an intermediate shape representation for creating geometry images in the form of a parametrization on a spherical domain that overcomes the limitations of the prior art method, and is able to efficiently learn 3D shape surfaces for subsequent analysis or generation. To this end, the method develops a robust method for 1) authalic spherical parametrization applicable to general 3D shape analysis 2) consistent spherical parameterization applicable for category specific 3D shape reconstruction. The parametrization is used to encode suitable intrinsic or extrinsic features of a 3D shape for 3D shape tasks. This encoded spherical parametrization is converted to a completely regular geometry image of a desired size. The use of these geometry images to directly learn shapes using a standard CNN architecture to classify and retrieve shapes or to reconstruct a 3D shape given a single image is described herein.

The embodiments described herein enable accurate authalic parameterization of genus-zero surface models using area restoring diffeomorphic flow and barycentric mapping. An approach to intrinsically learn 3D surfaces using a geometry image which encodes features invariant to isometry. As the shape is represented as an image, standard CNN techniques for learning and performing shape classification and retrieval tasks can be used. Additionally, the embodiments include a method that consistently parametrizes a shape across a shape class and then generates geometry images using shape correspondence techniques and encoded with point coordinates. This parametrized geometry image supports end-to-end learning between a 2D rendered image and corresponding 3D shape. The embodiments described herein enable a processing device carrying out a CNN shape classification and retrieval tasks using 3D shapes to perform its processing tasks more efficiently. The embodiments described herein enable use of CNN techniques for real-world shape classification and retrieval tasks based at least in part on the geometry images generated using the systems and methods described herein.

In one embodiment, a method for using a two-dimensional (2D) image representation of three-dimensional (3D) geometric objects in a machine learning framework has been developed. The method uses geometry images that represent 3D models of objects as 2D images forming geometry images and employing the geometry images as input to shape analysis tasks in a machine learning framework.

In another embodiment, a method using a two-dimensional (2D) image representation of three-dimensional (3D) geometric objects in a machine learning framework has been developed. The method includes generating a single 2D geometry image corresponding to a 3D object model, and providing the single geometry image as input to a shape analysis task to enable shape analysis of the 3D object model based only on information encoded in the single 2D geometry image in the machine learning framework.

In a further embodiment, the method includes generating the single 2D geometry image that encodes an extrinsic property of the 3D object model.

In a further embodiment, the method includes generating the single 2D geometry image that encodes an object shape extrinsic property of the 3D object model.

In a further embodiment, the method includes generating the single 2D geometry image that encodes a principal curvatures property of the 3D object model.

In a further embodiment, the method includes generating the single 2D geometry image that encodes an intrinsic property of the 3D object model.

In a further embodiment, the method includes generating the single 2D geometry image that encodes a Gaussian curvature intrinsic property of the 3D object model.

In a further embodiment, the method includes generating the single 2D geometry image that encodes a heat kernel signature intrinsic property of the 3D object model.

In a further embodiment, the method includes generating the 2D geometry image by performing an authalic spherical parametrization to map the three-dimensional object model to a surface of a sphere, mapping the spherical parameterization to an octahedron, and cutting the octahedron to form the 2D geometry image from a plurality of faces of the octahedron.

In a further embodiment, the method includes a shape classification process in which the single 2D geometry image is provided as an input to a trained convolutional neural network (CNN) to enable classification of the three-dimensional object model based on the single 2D geometry image.

In a further embodiment, the method includes a shape retrieval process in which the single 2D geometry image is provided as an input to a trained convolutional neural network (CNN) that generates an output vector. The shape retrieval process includes retrieval of another 2D geometry image stored in a database based on a Euclidean distance or a Manhattan distance between the output vector and a predetermined output vector of the other 2D geometry image stored in the database.

In a further embodiment, the method includes performing a shape regeneration process using the retrieved 2D geometry image from the database to generate another three-dimensional object and generating a visual display of the other three-dimensional object.

DETAILED DESCRIPTION

Figure 1:
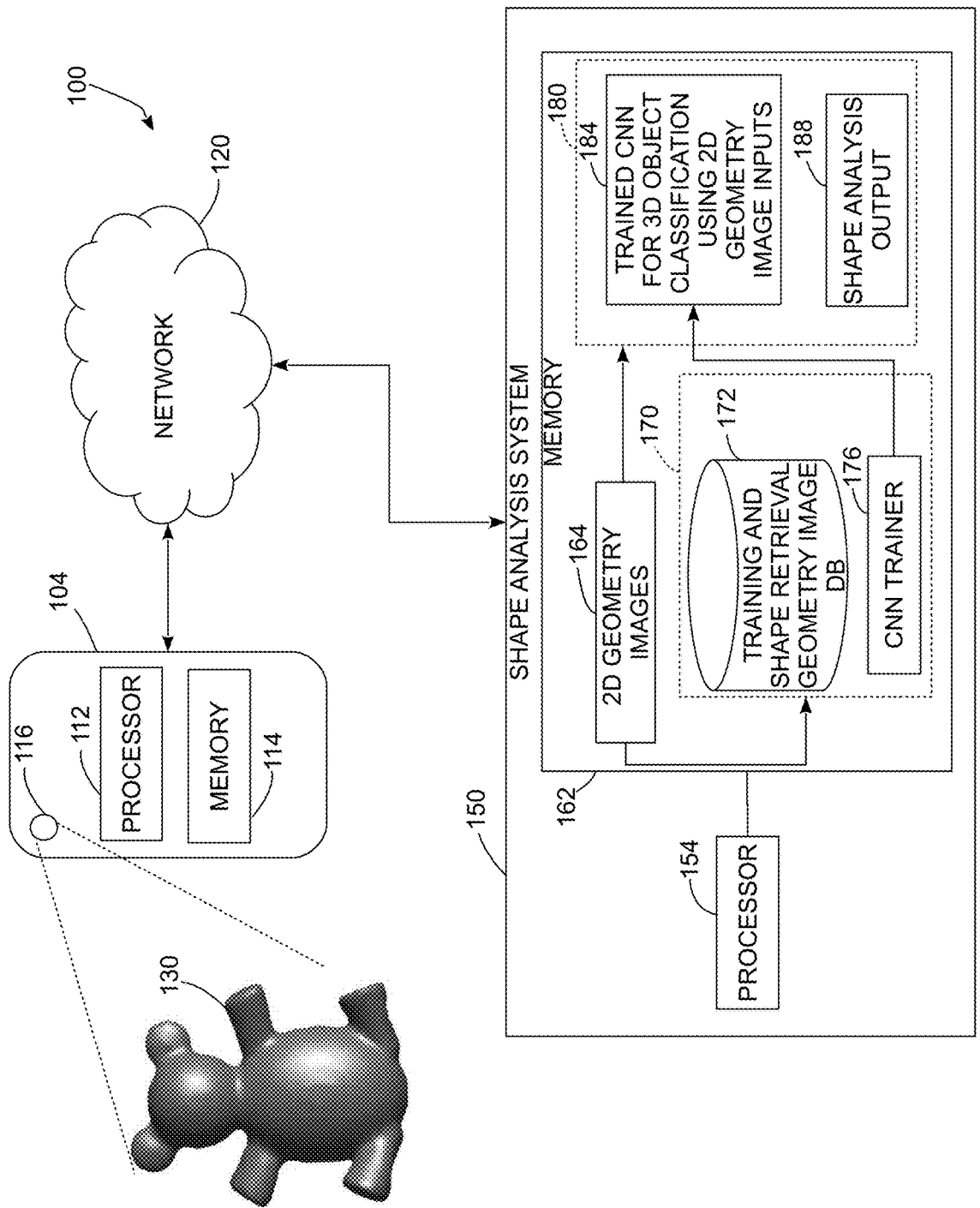
FIG. 1 is a schematic diagram of a machine learning system that is configured to train and use convolutional neural networks to recognize three-dimensional objects using geometry image data.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "rigid" object refers to an object with elements that do not experience substantial relative changes in angles, which are more formally known to the art as isometric transformations, during normal use. For example, a bookshelf is one example of a rigid object since while the entire bookshelf may experience affine transformations, such as moving to different positions and angles as a single unit, the individual components in the bookshelf remain at fixed angles relative to one another. As used herein, the term "non-rigid object" refers to an object that includes elements that experience isometric deformations in which elements of the object are expected experience changes in angle relative to one another in different positions. Common examples of non-rigid objects include the bodies of humans and other animals with appendages that can move relative to the rest of the body. The human hand is one example of a non-rigid object that is of interest to many human machine interface applications since movements of the fingers on the hand relative to each other and the palm of the hand are examples of isometric transformations. Other mechanical objects having moving parts that experience isometric transformations are also examples of non-rigid objects.

As used herein, the term "geometry image" refers to a single, two-dimensional arrangement of data points (typically referred to as "pixels") that corresponds to a mapping of the entire exterior three-dimensional structure of an object taken from all angles in a three-dimensional space to a two-dimensional plane. The coordinates and contents of the pixels enable a single geometry image to encode extrinsic and intrinsic properties of the entire exterior of the three-dimensional object from all angles in the three-dimensional space. The embodiments described below describe the generation of two-dimensional geometry images from three-dimensional object data and their use in shape analysis in machine learning frameworks to enable a wide range of practical applications including, but not limited to, object classification, shape completion, and image searching.

The "extrinsic properties" of an object refer to properties of the three-dimensional object that change if the object undergoes an isometric transformation. Examples of extrinsic properties that are encoded into a geometric image include a direct encoding of the object shape of a three-dimensional model itself, which is often encoded in the geometry image using Cartesian X, Y, Z coordinates; Spherical coordinates; and surface normal information. Another example of an extrinsic property refers to the principal curvatures of the surface of the three-dimensional object. Principal curvatures are known to the art as two eigenvalues of the shape operator at each point on the surface of the object. The principal curvatures measure how the surface bends by different amounts in different directions at each point. While not a strict requirement, in some embodiments described herein geometry images that encode extrinsic properties are used for shape analysis of rigid objects in machine learning frameworks including convolutional neural networks. The "intrinsic properties" of an object refer to properties that do not change (i.e. remain "invariant") in an object that undergoes isometric transformations. As described in further detail below, the Gaussian curvature and heat kernel signature (HKS) properties of a three-dimensional object that can be calculated using a geometry image that corresponds to the shape of the object are examples of intrinsic properties. While not a strict requirement, in some embodiments described herein geometry images that encode intrinsic properties are used for shape analysis of non-rigid objects in machine learning frameworks including convolutional neural networks.

FIG. 1 depicts a system 100 that implements a machine learning framework to perform machine learning operations to train neural networks and use the trained neural networks to classify three-dimensional object using two-dimensional geometry images that include encoded information for the three-dimensional objects. The system 100 includes a mobile electronic device 104 that communicates with a shape analysis system 150 using a data network 120. As described in further detail herein, the system 100 uses two-dimensional geometry images that are generated from the three-dimensional structure of an object to enable classification of both rigid and non-rigid objects. The teddy bear object 130 of FIG. 1 is one example of a non-rigid object in which relative angles of the arms, legs, and head of the teddy bear are expected to change from the pose that is depicted in FIG. 1. In the illustrative embodiment of FIG. 1, the system 100 performs training and inferencing operations to enable classification of three-dimensional objects such as the non-rigid teddy bear object 130 depicted in FIG. 1 as well as a wide range of both rigid and non-rigid objects without requiring completely different techniques to classify rigid and non-rigid objects.

In the system 100, the mobile electronic device 104 is embodied as a smartphone or other mobile electronic device that includes, for example, tablet computing devices, "smart" watches and glasses, other wearable electronic devices, and the like. The mobile electronic device 104 includes a processor 112, memory 114, and a three-dimensional object sensor 116. The mobile electronic device 104 is also communicatively connected to the shape analysis system 150 via a network 120, which is typically a local area network (LAN) or wide area network (WAN) that provide wired or wireless network communications between the mobile electronic device 104 and the shape analysis system 150.

In the mobile device 104 the processor 112 includes at least one central processing unit (CPU) core, and typically includes a graphical processing unit (GPU) and digital signal processors (DSPs) that process information received from the three-dimensional object sensor 116. In some embodiments the processor 112 generates two-dimensional geometry images based on scanned three-dimensional object data that are received from the three-dimensional object sensor 116, while in other embodiments the mobile electronic device 104 transmits the three-dimensional object data to the shape analysis system 150. While the embodiment of FIG. 1 depicts machine learning training and inferencing in a separate shape analysis system 150, in an alternative embodiment the processor 112 performs at least one of a machine learning training and inferencing process, and the processor 112 optionally includes acceleration hardware for the purpose of training a CNN or using a previously trained CNN for inferencing to classify three-dimensional objects using two-dimensional geometry images. In some embodiments the processor 112 integrates multiple computing devices in a System on a Chip (SoC) configuration. In the mobile device 104, the memory 114 includes both volatile data storage devices such as random access memory (RAM) and non-volatile data storage devices such as magnetic or solid state storage disks that store data and programmed instructions to control the operation of the mobile electronic device 104 and to store data received from the three-dimensional object sensor 116 and the shape analysis system 150.

The three-dimensional object sensor 116 of the mobile electronic device 104 is, for example, a three-dimensional depth camera that uses an infrared sensor or structured light sensor to generate three-dimensional data corresponding to the surface structure of the object 130. In other embodiments, the three-dimensional object sensor 116 further includes stereoscopic cameras, laser (LIDAR) and radio (RADAR) sensors, ultrasonic transducers, and any other suitable device that produces three-dimensional scanned data of the object 130. While the three-dimensional object sensor 116 is depicted as a single element in FIG. 1 for illustrative purposes, some embodiments include an array of sensors or two or more complementary devices that generate the scanned three-dimensional image data.

While FIG. 1 depicts a mobile electronic device 104 as one common application that employs three-dimensional object classification, in another embodiment a three-dimensional scanner including, for example, one or more depth cameras, LIDAR, millimeter wave RADAR, ultrasonic sensors, or other suitable three-dimensional sensors that need not be integrated with a mobile electronic device. For example, high-precision three-dimensional object scanners that are not integrated with a mobile device are also suitable for use with the system 100 to generate three-dimensional data that forms the basis of the parameterized geometric images to both train the CNNs in a training process and for performing inferencing to classify objects using trained CNNs.

In the system 100, the shape analysis system 150 includes a processor 154 and a memory 162. The processor 154 includes, for example, one or more central processing units (CPUs), graphical processing units (GPUs) and, in some embodiments, the processor 154 includes machine learning accelerator hardware. The machine learning accelerator devices increase the speed and efficiency of either or both of a training process that trains one or more CNNs to recognize three-dimensional objects based on geometry images and to an inferencing process that performs classification or other shape analysis operations of the objects using a geometry image of an object and a previously trained CNN. While depicted as a single system in FIG. 1, in some embodiments the shape analysis system 150 is implemented as a cluster of computing devices that perform the functions described herein.

In the system 100, the memory 162 includes both volatile data storage devices such as random access memory (RAM) and non-volatile data storage devices such as magnetic or solid state storage disks that store data and programmed instructions to control the operation of the shape analysis system 150. In particular, the memory 162 stores geometry image data 164 that the shape analysis system 150 generates based on three-dimensional object model data received from the mobile electronic device 104 or that the shape analysis system 150 receives from the mobile electronic device 104 in an embodiment where the mobile electronic device 104 generates the geometry image data directly.

The shape analysis system 150 uses the geometry image data 164 as an input to a training subsystem 170 and to an inferencing subsystem 180. The training subsystem includes CNN trainer 176 that implements a gradient descent learning process, an autoencoder, or any other suitable training process that is otherwise known to the art. Unlike prior art systems that seek to train a CNN to classify three-dimensional models based on three-dimensional data, the CNN trainer 176 uses a database of two-dimensional geometry images 172 that are received from the mobile electronic device 104 or other sources to enable the CNN trainer 176 to train a CNN 184 that classifies three-dimensional objects using two-dimensional geometry images from the database 172.

The training subsystem 170 produces the trained CNN 184 for three-dimensional object shape analysis using the two-dimensional geometry images 184 in the inferencing subsystem 180. The inferencing subsystem 180 also receives geometry images 164 to classify objects using the previously trained CNN 184 and the inferencing subsystem 180 generates a shape analysis output 188. Unlike prior-art classification systems, the inferencing subsystem uses the two-dimensional geometry images as inputs to the CNN 184. The operation of the trained CNN 184 is otherwise known to the art. In the configuration of FIG. 1, the training subsystem 170 trains a "deep" CNN with a structure that includes at least one hidden layer of neurons between an input layer and an output layer. The structures of deep CNNs are otherwise known to the art and are not discussed in greater detail herein. While FIG. 1 depicts a single CNN 184 that is configured to be trained to perform inference based on both extrinsic and intrinsic geometry images for rigid and non-rigid objects, respectively, in alternative configurations the train CNN 184 includes multiple CNNs that are trained to detect either rigid objects using extrinsic property geometry images (e.g. object shape and principal curvatures geometry images) or non-rigid objects using intrinsic property geometry images (e.g. Gaussian curvature and heat kernel signature geometry images). The output of the CNN 184 is, as is known to the art, an output vector of numeric values from an output neuron layer in the CNN 184. These output vectors form the basis for a wide range of additional classification and object shape analysis operations. For example, the output vectors may correspond to a simple text or photographic identifier for the object that is transmitted to the mobile electronic device 104 or another computing system, a search request to a search engine based on the classification of the object, a product lookup in an inventory system using an identified stock keeping unit (SKU) that is associated with the object, a three-dimensional object reproduction process that uses stored geometry images to reproduce a three-dimensional object model, a shape completion process, or any other suitable output that is based on the classification of the three-dimensional object. While FIG. 1 depicts a shape analysis system 150 that is configured to perform both training and inferencing for illustrative purposes, in alternative configurations separate systems perform the training and inferencing operations.

FIG. 1 depicts a system configuration that uses multiple computing devices, including the mobile electronic device 104 and the shape analysis system 150, to perform object shape analysis operations using the processes described herein. However, those of skill in the art will recognize that alternative computing hardware configurations perform the processes described herein using different combinations of hardware and software functionality. For example, while FIG. 1 depicts an illustrative embodiment in which the shape analysis system 150 receives scanned 3D image data from the mobile electronic device 104 prior to generating the geometry image data, in another embodiment the mobile electronic device 104 generates one or more geometry images and transmits the geometry images to the shape analysis system 150 for further processing in a CNN training or inferencing operation. Furthermore, a single computing device that receives the three-dimensional image data or a properly generated geometry image of the object may perform the processes described herein to perform either or both of training CNNs and using the CNNs for inferencing in a machine learning framework.

Figure 2:
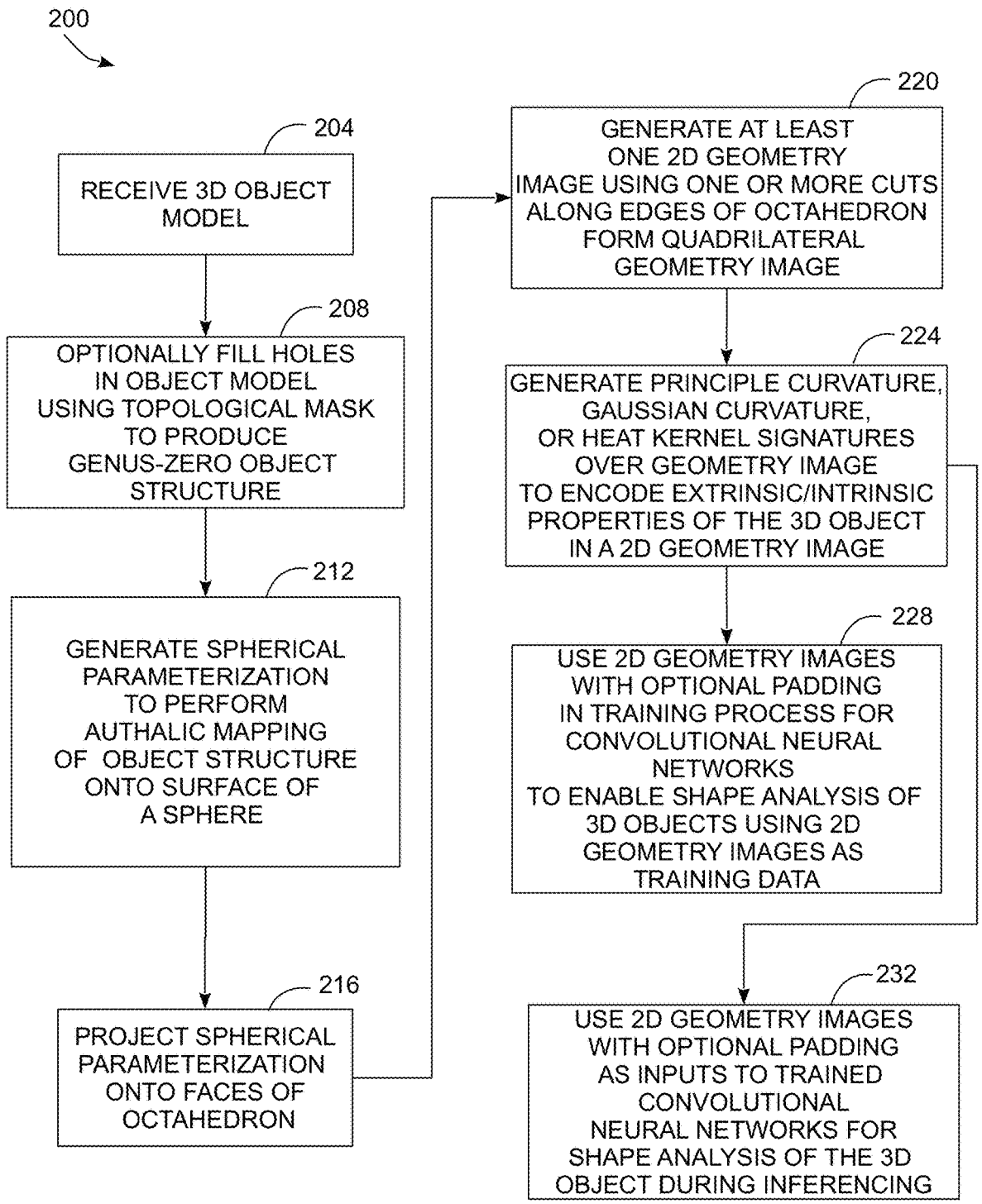
FIG. 2 is a block diagram of a method for generating two-dimensional geometry images based on three-dimensional models of a physical object and for encoding extrinsic and intrinsic information into the geometry images for training and inference using convolutional neural networks in a machine learning framework.

FIG. 2 depicts a process 200 for machine learning that trains CNNs to classify 3D objects using specifically generated two-dimensional geometry images that enable improved classification of both rigid and deformable three-dimensional objects. The process 200 is described in conjunction with the system 100 of claim 1 for illustrative purposes. In the discussion below, a reference to the process 200 performing an action or function refers to the operation of processors in one or more computing devices to execute stored program code to perform the function or action in conjunction with other components in the system 100.

The process 200 begins as the system 100 receives three-dimensional object data (block 204). In the system 100, the mobile electronic device 104 generates three-dimensional image data of the object, such as the object 130 or other objects, using the three-dimensional object sensor 116. In one embodiment, the processor 112 in the mobile electronic device generates a three-dimensional geometric mesh from the input data received from the sensor 116 to form a three-dimensional representation of the object 130. In the embodiment of FIG. 1, the processor 112 receives a "point cloud" of three-dimensional data from the sensor 116 corresponding to the object 130. The processor 112 generates a three-dimensional mesh based on the sensor data as the three-dimensional object data that represents the object 130, where the mesh includes vertices positioned in a three-dimensional space and edges that connect the vertices to form a model that corresponds to the three-dimensional structure of the object 130. In the embodiment of FIG. 1, the mobile electronic device 104 transmits the three-dimensional model to the shape analysis system 150 via the data network 120, although in alternative configurations the mobile electronic device 104 performs additional processing prior to transmission of the 3D object data or a geometry image to the shape analysis system 150.

The process 200 continues as the shape analysis system 150 optionally modifies the three-dimensional object data to produce a genus-zero surface model (block 208). A "genus-zero surface" refers to an object that does not include a structure that encloses a hole that passes through the object. For example, the teddy bear 130 of FIG. 1 is a genus-zero surface since the structure of the object does not enclose any holes. During the process 200, the system 100 does not perform additional processing to fill holes for objects that are already have a genus-zero structure, such as the teddy bear 130 of FIG. 1. However, some objects such as the bookshelf 304 and the chair 350 of FIG. 3 include holes and are not directly suitable for the spherical parameterization methods that are described below to produce two-dimensional geometry images for training and inferencing in a machine learning framework. The system 100 uses a topological mask to infer the holes in the original shape and reproduce the mesh model. These steps ensure that parametrization techniques from discrete differential geometry literature are applicable to a shape of arbitrary topology. A surface mesh, M is represented as V, F, E wherein V is the set of vertex coordinates, F the set of faces, and E the set of edges constituting all faces. With abuse of notation, the mesh models following the Euler characteristic are provided by:

$$2-2m=|V|-|E|+|F| \quad (1)$$

where |x| indicates the cardinality of feature x and m is the genus of the surface. This genus-zero shape serves as input to the authalic parameterization procedure. Note that a non genus-zero shape has an associated topological geometry image informing the holes in the original shape.

Figure 3:
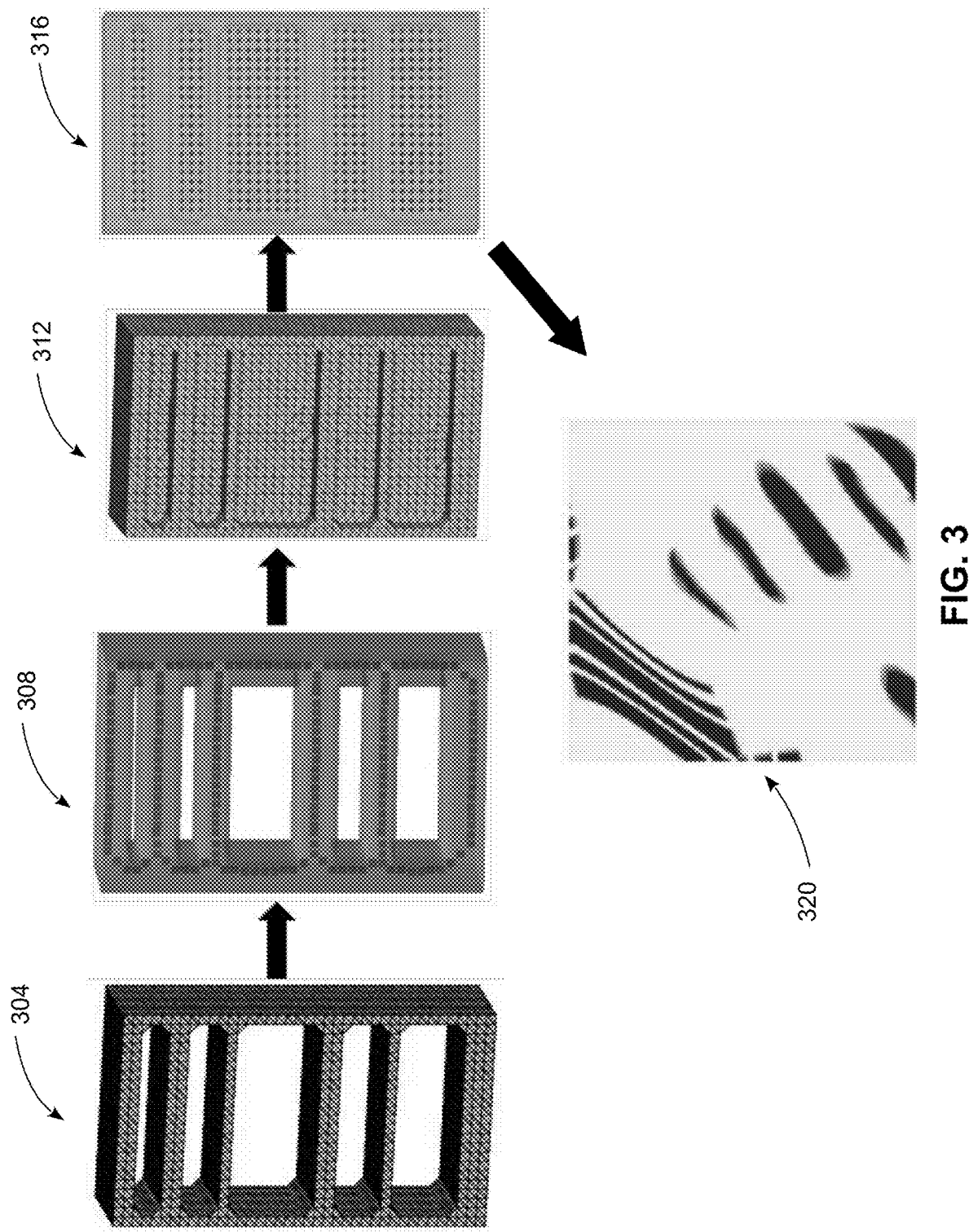
FIG. 3 is a diagram depicting a transformation of non-zero genus surface objects to genus-zero surface objects.
Figure 3:
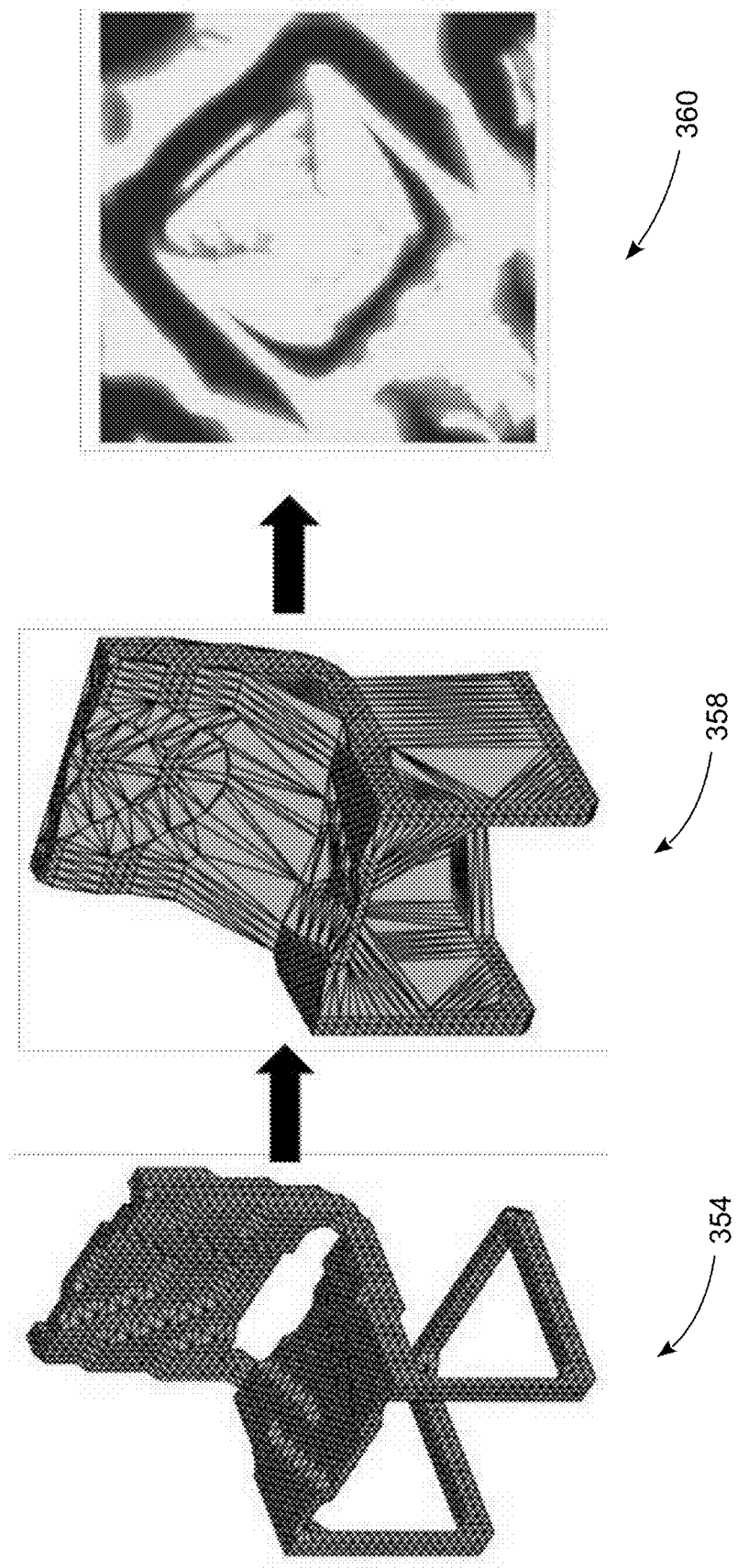

As depicted in FIG. 3, the system 100 generates genus-zero approximations of the original higher genus shapes that are suitable for the use in a spherical parameterization process to generate geometry images based on the three-dimensional object models. In one embodiment, the system 100 performs a medial axis filling process to convert the genus-five bookshelf 304 to a genus-zero object by filling in the holes that correspond to the individual shelves in the bookshelf as seen in models 308, 312, and 316. In another embodiment, the system 100 performs an α-shape filling process to fill in the holes for the chair model 354 to produce the genus-zero object model 358. As described in more detail below, the genus-zero objects enable either the mobile electronic device 104 or the shape analysis system 150 to generate two-dimensional geometry images using a spherical parameterization process. FIG. 3 depicts examples of the geometry images 320 and 360 that correspond to the genus-zero bookshelf model 316 and chair model 358, respectively.

The process 200 continues as the system 100 generates a spherical parameterization to map the structure of the genus-zero object onto a surface of a sphere (block 212). In brief, the spherical parameterization process maps the vertices of the three-dimensional object model to the surface of a sphere where the location of each vertex on the sphere and a parameter for the vertex that describes the distance of the vertex from a fixed barycenter location enables the spherical parameterization to capture the information contained in an arbitrary three-dimensional model using a single spherical shape representation. The spherical parameterization process use an iterative vertex displacement procedure from the original mesh to the spherical mesh using barycentric coordinates. This parametrization is used in conjunction with spherical area sampling and functional interpolation techniques to output a geometry image of a desired size. The geometry image simplifies complex 3D tasks such as noise removal or mesh morphing in the derived regular 2D domain.

In one embodiment, the authalic spherical parametrization takes as input any spherically parameterized mesh and iteratively minimizes the areal distortion in three steps described in detail below and outputs a bijective map onto the surface of a sphere. The spherical parametrization suggested in may suitably be used for initialization due to its speed and ease of implementation. The spherical parameterization is performed with an iterative process with three major components:

1. At every iteration, first evaluate a scalar harmonic field corresponding to the areal distortion ratio of vertices in the original mesh and spherical mesh by solving a Poisson equation.
2. Evaluate the gradient field of the harmonic function on the original mesh. This field is indicative of the required vertex displacements on the spherical mesh so as to decrease the areal distortion ratio. A unique gradient vector for each vertex is obtained as weighted mean of incident angle of each face at the vertex and the corresponding gradient value.
3. Displace the vertices on the original mesh and then map these displacements onto the spherical mesh using barycentric mapping, i.e., vertex displacements on the original mesh serve as proxy to determine the corresponding displacements on the spherical mesh. Barycentric mapping is possible because the original and spherical mesh have the same triangulation. The barycentric coordinates of displaced vertices are evaluated with respect to triangles in the one-ring, and the triangle with all coordinates less than 1 is naturally chosen as the destination face. The vertex in the spherical mesh is then mapped to the corresponding destination face with the same barycentric weights. The purpose of this indirect mapping procedure is twofold: (1) The vertex displacements minimizing areal distortion are constrained to be on the input mesh, which in turn ensure the mapped displacements onto the spherical domain are well behaved. (2) Additionally, the constraint that the vertices remain on the mesh model minimize triangle flips and alleviate the need for an expensive re-triangulation procedure after each iteration. The iterations continue until convergence. In practice the iterations may be stopped after the all areal distortion ratios fall below a threshold or the maximum number of iterations has been reached.

The spherical parameterization is described mathematically using the following process:

Input: $\mathcal{M} = (V, F, E)$, (Vertices, Faces, and Edges) for the original mesh model, $n_{max}$ for the maximum number of iterations, and an error threshold $\epsilon$.

Output: $V_s$, a set of spherical coordinates on spherical domain S.

1. Initialize V, using any spherical parameterization (assumed to be inaccurate)
2. Compute $\hat{L} \leftarrow \text{pinv}(L)$, where pinv is the pseudo-inverse of the cotangent Laplacian L.
3. Perform an iterative process: while $\epsilon < \max_u(\delta h_u)$ AND iterations$<n_{max}$
   Compute $$\delta h_u \leftarrow \frac{A_u^s}{A_u} - 1;$$

the areal distortion;
   Compute $g \leftarrow \hat{L} \delta h_u$; the scalar field
   Compute $\nabla g$; the gradient field at each face
   Compute $\nabla g_v$; the gradient field at each vertex (v);
   Compute $v \leftarrow v + \rho \nabla g_v$, the displacement on the original three-dimensional mesh model M
   Perform mapping $v_s \leftarrow \text{bary}(v)$ as a barycentric mapping from M to the surface of the sphere S
   Perform $v_s \leftarrow \text{norm}(v_s)$ to normalize the spherical coordinates.
4. After completion of the iterative process, return the parameterized sphere coordinates $V_s$ that represent the spherical parameterization of the three-dimensional model.

The spherical mapping process described above is referred to as an "authalic" or "equal area" mapping that preserves the total area of any three points that define a region on the surface of the original three-dimensional object when the same region is mapped to the surface of the sphere. Since many three-dimensional models are formed from polygon meshes that can be decomposed into triangles, the spherical mapping process produces the spherical parameterization with the triangles of the original 3D model mapped onto the surface of the sphere with each triangle having substantially the same area as in the original 3D model. In particular, the iterative process described above minimizes the areal distortion of the spherical parameterization over successive iterations of the parameterization process, which produces a spherical parameterization with the area-preserving authalic property.

Most three-dimensional objects of interest for shape analysis in the system 100 have a non-zero Gaussian curvature, and the spherical parameterization process introduces some degree of angular distortion (e.g. the angles of at least some of the vertices in the original 3D mesh object experience distortion on the spherical parameterization). The authalic mapping produces some degree of distortion in the angles of the triangles that are formed on the surface of the spherical parameterization while preserving the areas of the triangles. Another spherical parameterization technique optimizes for a "conformal" property that seeks to reduce or eliminate the angular distortions at the expense of producing area distortions, while still other techniques produce intermediate levels of area distortion and angular distortion in the spherical parameterization.

Figure 4:
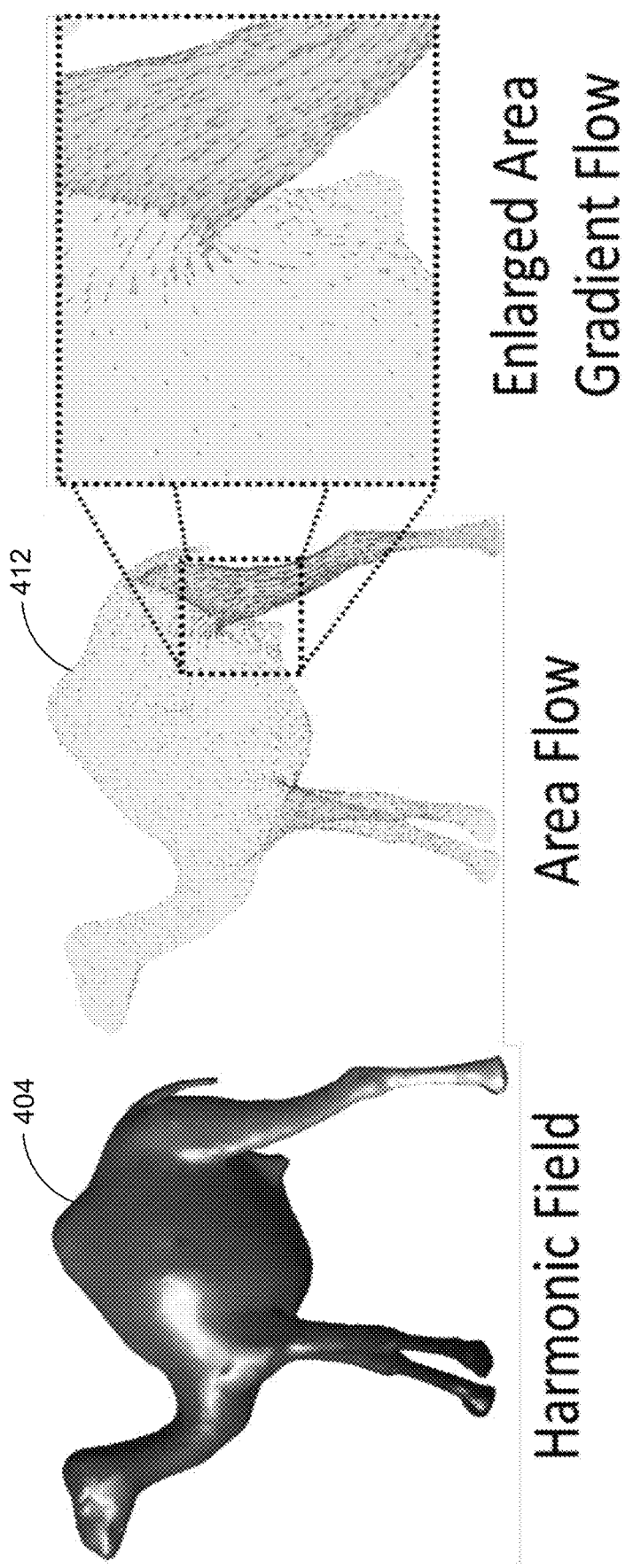
FIG. 4 is a diagram depicting harmonic fields and area flows on a non-rigid three-dimensional object model and the effects of multiple iterations in an authalic spherical parameterization process for the three-dimensional object model.
Figure 4:
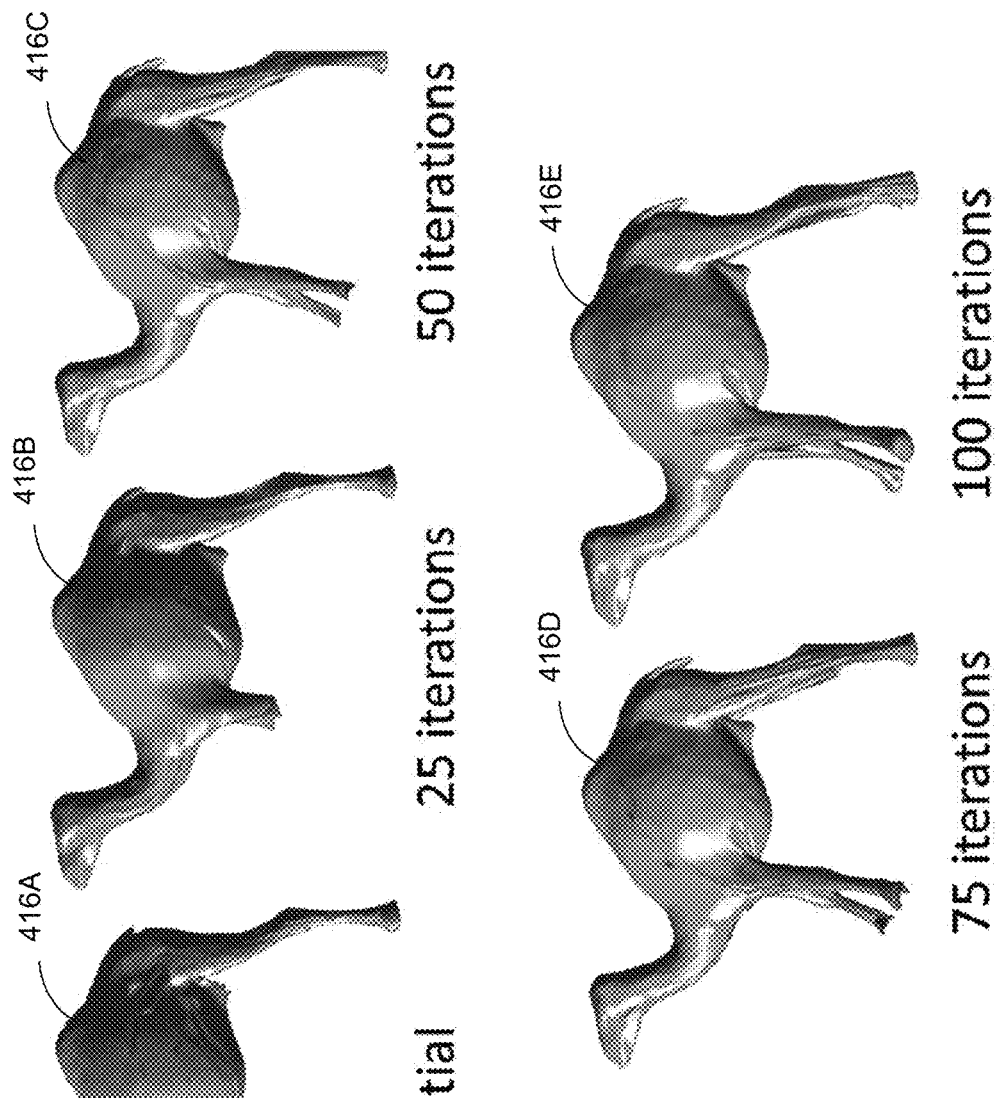

FIG. 4 depicts a graphical representation of the accuracy of the spherical parameterization process over progressively larger numbers of iterations using a non-rigid model of a camel 404 for illustrative purposes. FIG. 4 depicts a harmonic field on the surface of the model 404 with the depiction 412 showing an area gradient flow of the harmonic field on the surface of the camel model 404. The spherical projection process uses these properties of the mesh structure of the camel 404 to produce a spherical projection. The series of camel images 416A-416E represent a reconstruction of the camel starting from a spherical parameterization that is produced using a single iteration (416A) and with increasing numbers of iterations up to 100 iterations (416E) of the spherical parameterization process that is described above. As depicted in FIG. 4, increasing the number of iterations produces a spherical parameterization that more accurately reflects the original three-dimensional object model. In particular, additional iterations in the spherical parameterization process tend to improve the accuracy of reproducing the shapes of projections in the three-dimensional model, such as the legs of the camel 404. Different embodiments of the process 200 use a different number of iterations based on requirements for accuracy in the spherical projection balanced with the increased computational cost that is required to perform larger numbers of iterations in the spherical parameterization process.

The resolution of the spherical parameterization and corresponding geometry images that are generated from the spherical parameterization can vary based on the computational power and performance requirements of different embodiments of the system 100. In general, there are two determining factors for the resolution of a geometry image: (i) The number of training samples and features in the original three-dimensional mesh model. Currently there are no large databases for non-rigid shapes, and hence, a large resolution will lead to a large number of weight parameters to be learnt in the CNN. Although there are large databases for rigid shapes, the number of geometry features (e.g. protrusion, corners etc.) in rigid shapes is typically much lower compared to images and even articulated objects. The size of the geometry image is set to be 56×56 for all experiments on rigid and non-rigid datasets. This balances the number of weights to be learned in CNN and capturing relevant features of a mesh model. The number of layers in CNN is determined by the size of the training database. Hence, a relatively shallow architecture may be chosen for the non-rigid database compared to the rigid database.

Figure 5:
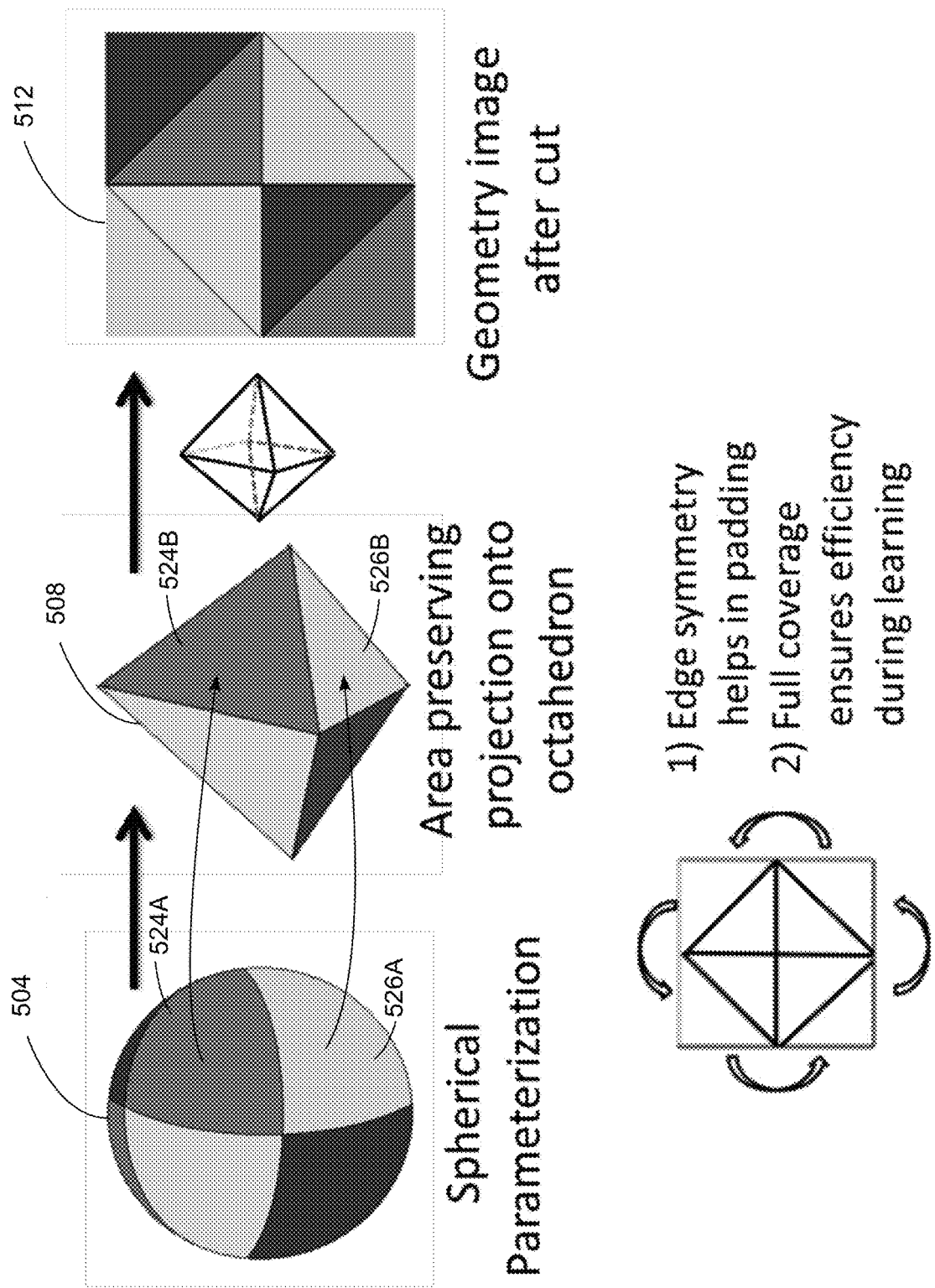
FIG. 5 is a diagram depicting a projection of the authalic spherical parameterization to produce a two-dimensional geometry image.
Figure 5:
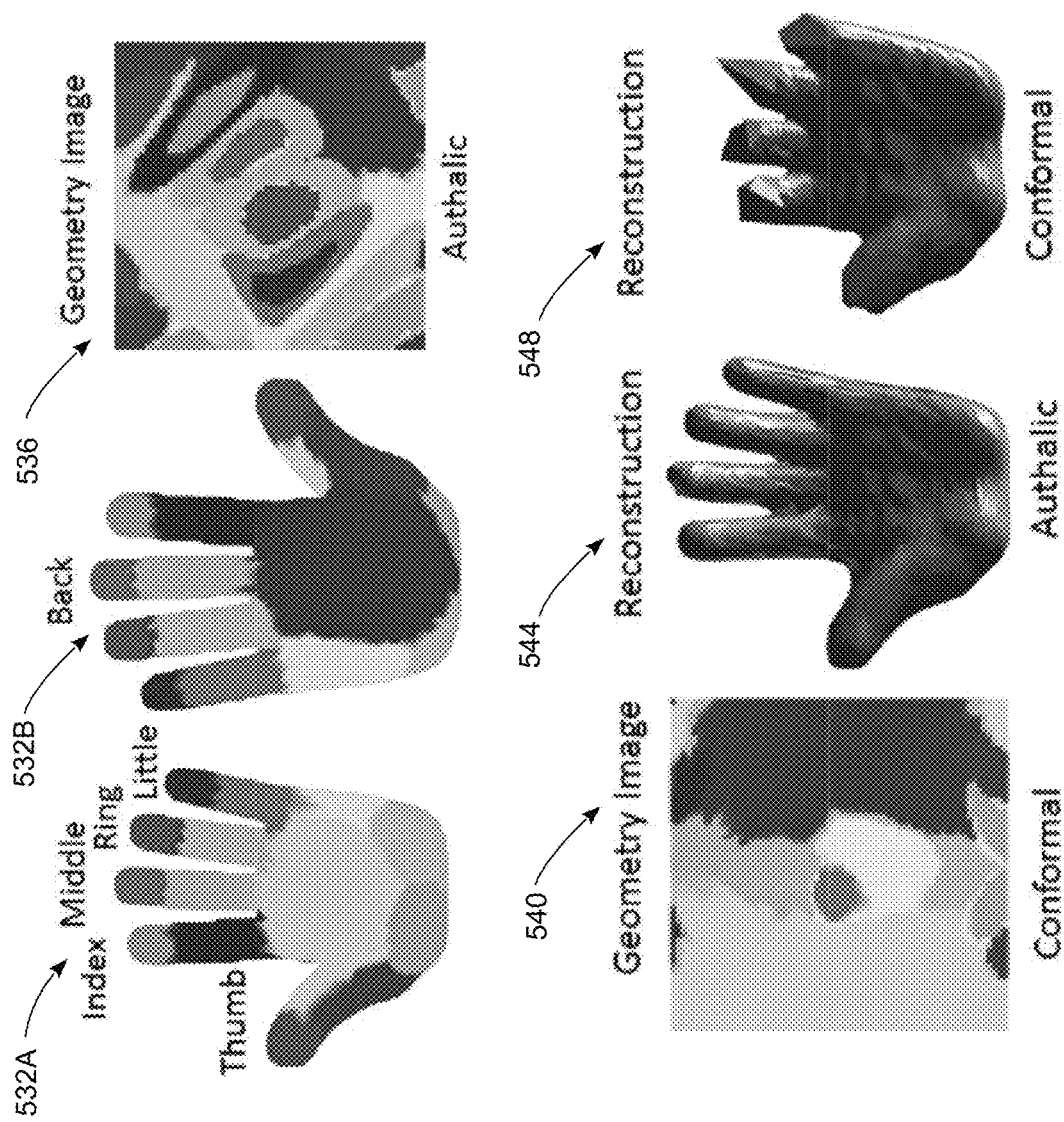

Referring again to FIG. 2, the process 200 continues as the system 100 performs a projection that maps the spherical parameterization to a plurality of eight (8) faces of an octahedron (block 216). FIG. 5 depicts a visualization of the projection of points on the surface of the spherical parameterization 504 to the eight faces of an octahedron 508. For example, two octants 524A and 526A in the spherical parameterization 504 map to faces 524B and 526B of the octahedron 508, respectively, and all of the eight octants on the sphere 504 map to one of the faces of the octahedron 508 in a similar manner. The mapping process from the octants of the sphere 504 to the faces of the octahedron preserves the authalic properties of the three-dimensional object in the spherical parameterization 504 that are described above.

A mapping from the sphere to the octahedron that is both conformal and authalic is isometric, and must have zero Gaussian curvature everywhere. However, since a large majority of three-dimensional objects lack zero Gaussian curvature in all locations, the mapping cannot preserve both the authalic and conformal properties. During the process 200, the system 100 performs an area-preserving (authalic) projection from the parameterized sphere to the surfaces of the octahedron instead of an angle-preserving (conformal) projection. For purposes of machine learning for object classification, the authalic projection presents advantages that the encoded information in the sphere and the octahedron preserve information about the shapes of different elements in the object even if the precise angles between the elements may be distorted during the projection process. Since the process 200 is a machine learning process for classification of objects, the distortions to the angles of objects in the spherical projection process do not present substantial issues to object classification using the CNNs that are described in further detail below. Furthermore, the equal-area authalic projection is useful for both rigid and non-rigid objects since the authalic projection preserves the shape of the object and enables training of a CNN classifier that can classify and perform shape analysis operations for a non-rigid shape even if the non-rigid shape experiences an isometric transformation from the training data. For example, the camel 404 in FIG. 4 includes a head, and legs that can move from the precise pose that is depicted in FIG. 4. The authalic projection for generation of a geometry image improves the accuracy of classifying another camel with the same general body shape but with head or legs that are not in the same position that is depicted in FIG. 4.

As described above, the spherical parametrization introduces some form of distortion for objects that have non-zero Gaussian curvature, and most real-world objects other than cylinders have non-zero Gaussian curvature. In the process 200, while the authalic spherical parameterization and subsequent projection to an octahedron ensures that the total area of each triangle in the original there-dimensional model remains constant in the spherical parameterization 504, octahedron 508, and the final geometry image 512, the relative angles of elements that are encoded in on the spherical parameterization 504 experience distortion. Thus, the authalic equal-area mapping of the process 200 is not a "conformal" ("equal angle") mapping that preserves angles. However, the authalic mapping of the process 200 has benefits for at least some embodiments of machine learning applications that classify rigid and non-rigid three-dimensional objects. For example, FIG. 5 depicts two views of a hand including a front view 532A and back view 532B. The process 200 produces a geometry image 536 using the area-preserving authalic mapping that is described above while a prior-art process produces another geometry image 540 using the angle-preserving conformal mapping. However, a three-dimensional reconstruction of the hand 544 that is based on the authalic geometry image 536 clearly shows the structures of the fingers and thumbs with a high degree of accuracy while a reconstruction 548 of the conformal geometric image 540 shows severely truncated fingers and thumbs. Thus, the process 200 generates the geometry image with the authalic projection to produce a geometry image that captures the structure of the hand with greater accuracy even if the authalic projection may distort some of the angles in the original three-dimensional model. In alternative embodiments, the spherical parameterization process preserves the angles of the three-dimensional object at the expense of producing areal distortion in a conformal parameterization or produces an intermediate level of distortion for both areas and angles.

In the process 200, the accuracy of the authalic spherical parametrization stems from the accuracy of the original spherical parameterization that is described above and an area-restoring diffeomorphic flow modeled using discrete differential geometry. This parametrization is used in conjunction with spherical area sampling and functional interpolation techniques to output a geometry image of a desired size. The geometry image simplifies complex 3D tasks such as noise removal or mesh morphing in the derived regular 2D domain. These geometry images can be used in a CNN architecture to classify and retrieve shapes. In the presence of sufficient training data, the two principal curvatures suffice to accurately learn a shape representation without resorting to complex multiscale shape signatures.

Figure 6:
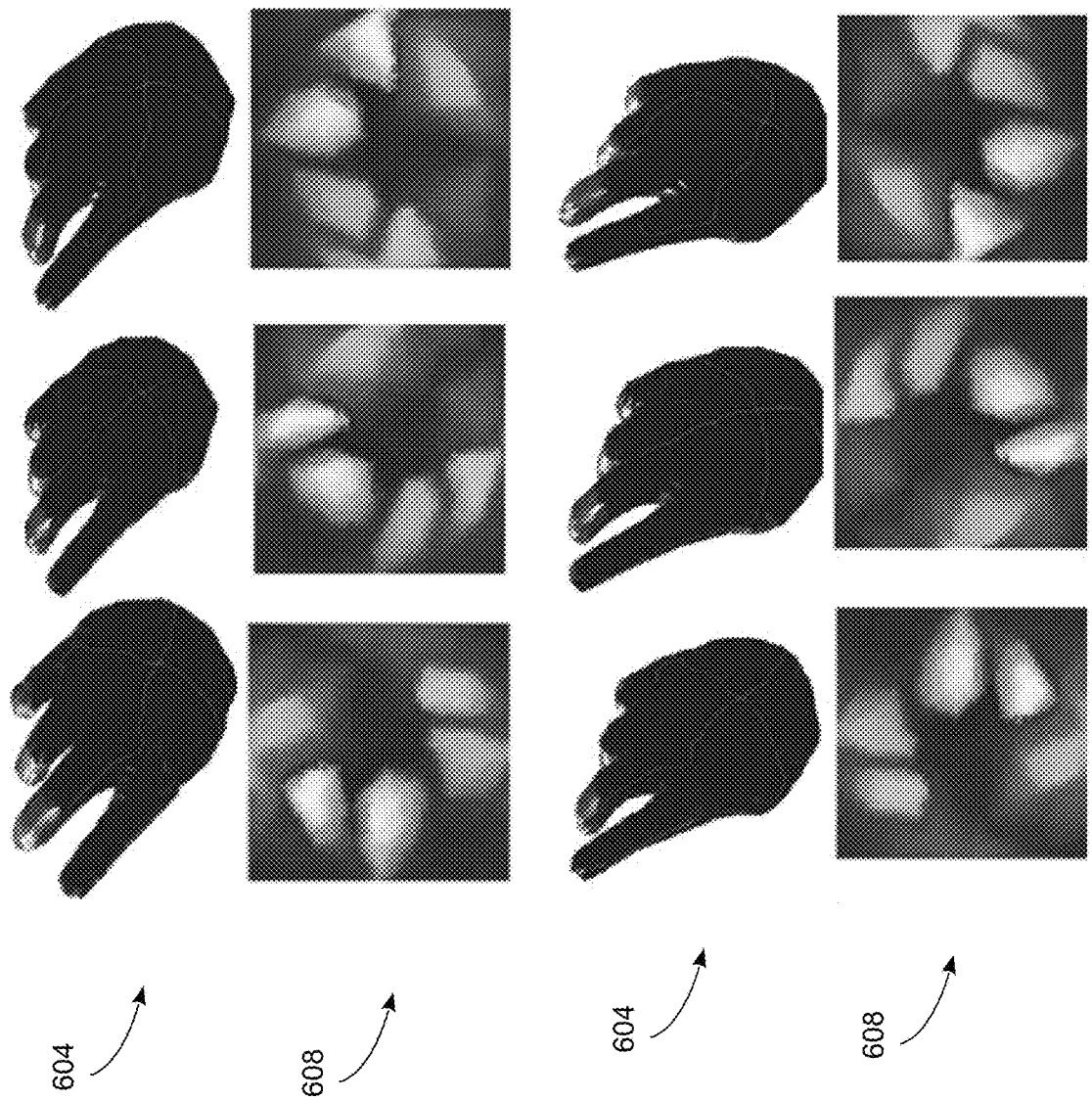
FIG. 6 is a diagram depicting multiple geometry images that are generated for a non-rigid object and a rigid object.
Figure 6:
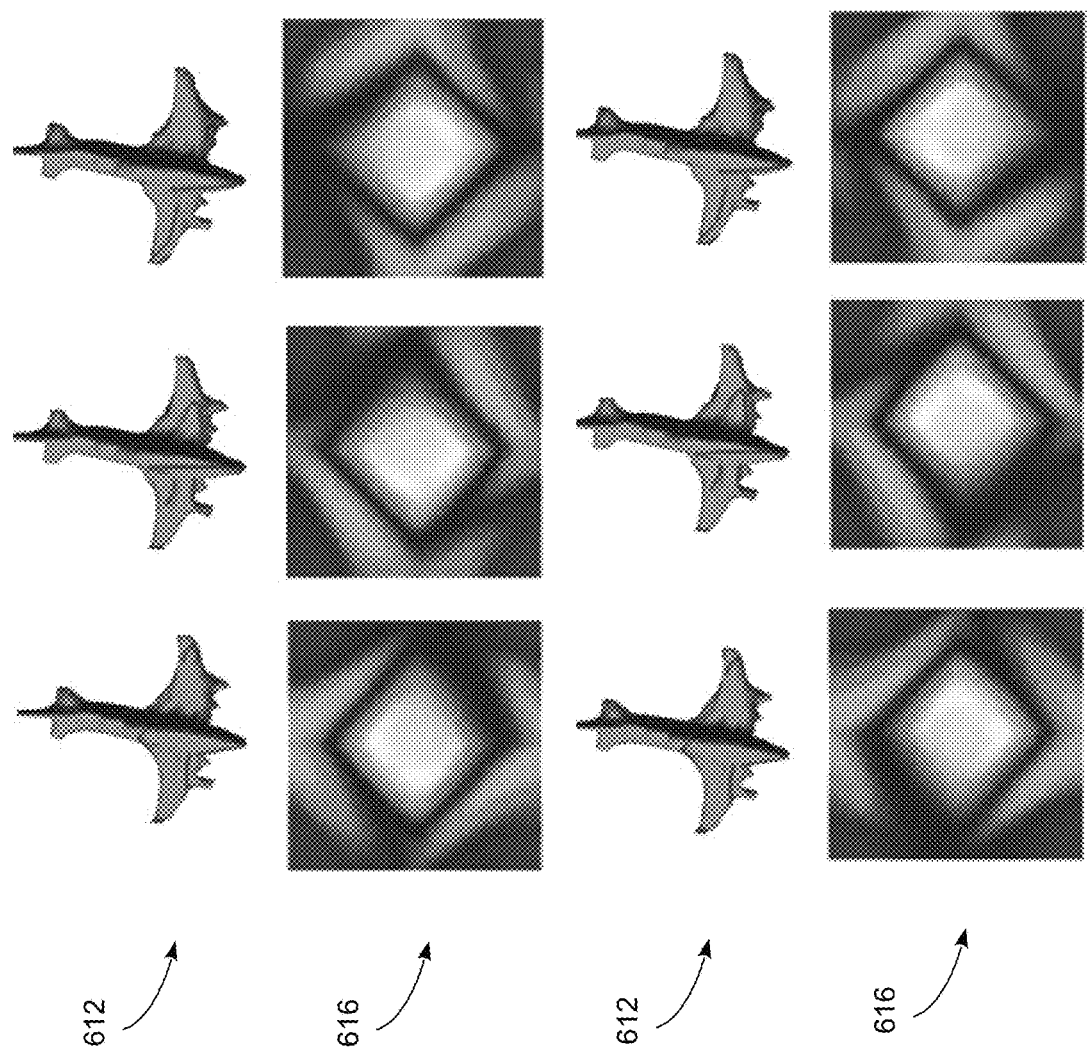

Referring again to FIG. 2, the process 200 continues as the system 100 generates a two-dimensional geometry image by mapping the faces of the octahedron to a two-dimensional quadrilateral geometry image (block 220). As depicted in FIG. 5, the octahedron 508 includes a total of eight triangular faces. The system 100 "cuts" the octahedron along edges between the faces to convert the octahedron to a two-dimensional quadrilateral geometry image 512. As depicted in FIG. 5, the geometry image 512 includes all eight triangular faces of the octahedron 508. In some embodiments, the system 100 generates multiple geometry images from the octahedron by adjusting the locations of the cuts that form the geometry image. The geometry image 512 exhibits reflective symmetry along the vertical, horizontal and diagonal axes shown in FIG. 6. Due to this symmetry, replicants can be created without any discontinuities along any edge or corner of the image. This property is useful for implicitly informing a machine learning model about the warped mesh the image represents. FIG. 6 depicts two different three dimensional objects, including a non-rigid hand 604 and a rigid airplane 612 that each form the basis for a single spherical parameterization as described above. The system 100 generates a plurality of geometry images 608 for the hand 604 and another plurality of geometry images 616 for the airplane 612. Each of the geometry images is formed from the octahedron that is generated for the corresponding spherical parameterization but with a different set of cuts that corresponds to geometry images that are projected from different viewing directions around the three-dimensional object in a three-dimensional space. While not a strict requirement for the process 200, the generation of multiple geometry images improves the effectiveness of training and inference with convolutional neural networks.

As described above, the system 100 generates one or more geometry images that are based on the structure of the three-dimensional object model. In a basic form, each pixel in the geometry image encodes a surface coordinate of the spherical parameterization in three dimensions with the two-dimensional coordinates corresponding to a location on the surface of the original spherical parameterization and the numerical value of the pixel corresponding to a distance from the barycenter of the corresponding location on the original three-dimensional object model. This information may be encoded using several different techniques including, for example, Cartesian X, Y, Z coordinates; Spherical coordinates; and surface normal information. Each of the encodings above provides a different way to reconstruct the shape from the basic extrinsic geometry image that corresponds to the shape of the three-dimensional object. For example, Poisson shape reconstruction can done by using the point coordinates and normal information. Recall, there is a single parametrization for a shape and all geometry images are derived from this single parametrization using correspondence information. Thus, the basic geometry images correspond directly to the original shape of the three-dimensional object. The process 200 generates an additional geometry image that encodes additional extrinsic and/or intrinsic properties based on the curvature of the shape that is encoded in the first geometry image (block 224). The additional curvature information enables training and subsequent inferencing with a CNN that recognizes both extrinsic properties and intrinsic properties in the structure of the three-dimensional object since these properties are encoded into the geometry images.

In different embodiments of the process 200, the system 100 encodes additional extrinsic properties, intrinsic properties, or both, using the initial geometry image of the shape of the object as the input to produce additional geometry images of the principal curvatures, Gaussian curvature, and heat kernel signature (HKS). As noted above, the two principal curvatures, κ1 and κ2 are extrinsic properties that measure the degree by which the surface bends in orthogonal directions at each point in the geometry image. The principal curvatures are in effect the eigenvalues of the shape tensor at a given point. During the process 200, the system 100 uses either or both of the object shape geometry image that is generated during the processing of block 220 described above and the geometry image that is based on the extrinsic principal curvatures as training inputs to train a CNN that can recognize rigid objects during an inferencing operation.

The Gaussian curvature κ is an extrinsic property that is defined as the product of the principal curvatures at a point on the surface, κ=κ1 κ2. Gaussian curvature is an intrinsic descriptor. The sign of Gaussian curvature indicates whether a point is elliptic (κ>0), hyperbolic (κ<0) or flat (κ=0). In the context of the process 200, the HKS for each pixel does not refer to the physical temperature of an object. Instead, the HKS is an extension of Gaussian curvature. Heat kernel signature calculated over a geodesic ball of radius tending to zero (or time t tending to zero) converges to the Gaussian curvature. So heat kernel signature is an intrinsic property of the object that provides a higher order curvature description than the Gaussian curvature. The heat kernel, ht is the solution to the heat diffusion equation. The heat kernel signature (HKS) at every point is the amount of untransferred heat after time t. The heat kernel is another intrinsic property that is invariant under isometric transformations and stable under small perturbations to the isometry, such as small topological changes or noise, i.e., is intrinsic. Additionally, the time parameter t in the HKS controls the scale of the signature with large t representing increasingly global properties, i.e. for a multiscale signature. Variants of the heat kernel include the GMS and GPS which differ in the weighting of the eigenvalues.

The additional intrinsic information that is encoded in the geometric images as RGB pixel values in images which are fed as input to a CNN. Unlike traditional machine learning architectures, CNNs have the property of weight sharing reducing the number of variables to be learned. The principle of weight sharing in convolutional filters extensively applied to image processing is applicable to learning 3D shapes using geometry images as well. This is because shapes like images are composed of atomic features and have a natural notion of hierarchy. However, different features are encoded in the pixels of the geometry image for rigid and non-rigid shapes as it helps a CNN to discriminatively learn shape surfaces. The Gaussian curvature is the most atomic and intrinsic property suitable for non-rigid shape analysis. The heat kernel signature too can be interpreted as an extension to Gaussian curvature. During the process 200, the system 100 uses an intrinsic geometry image that corresponds to either of the Gaussian curvature or the heat kernel signature for training and inferencing of the CNN 184 when performing shape analysis on non-rigid objects.

Figure 7A:
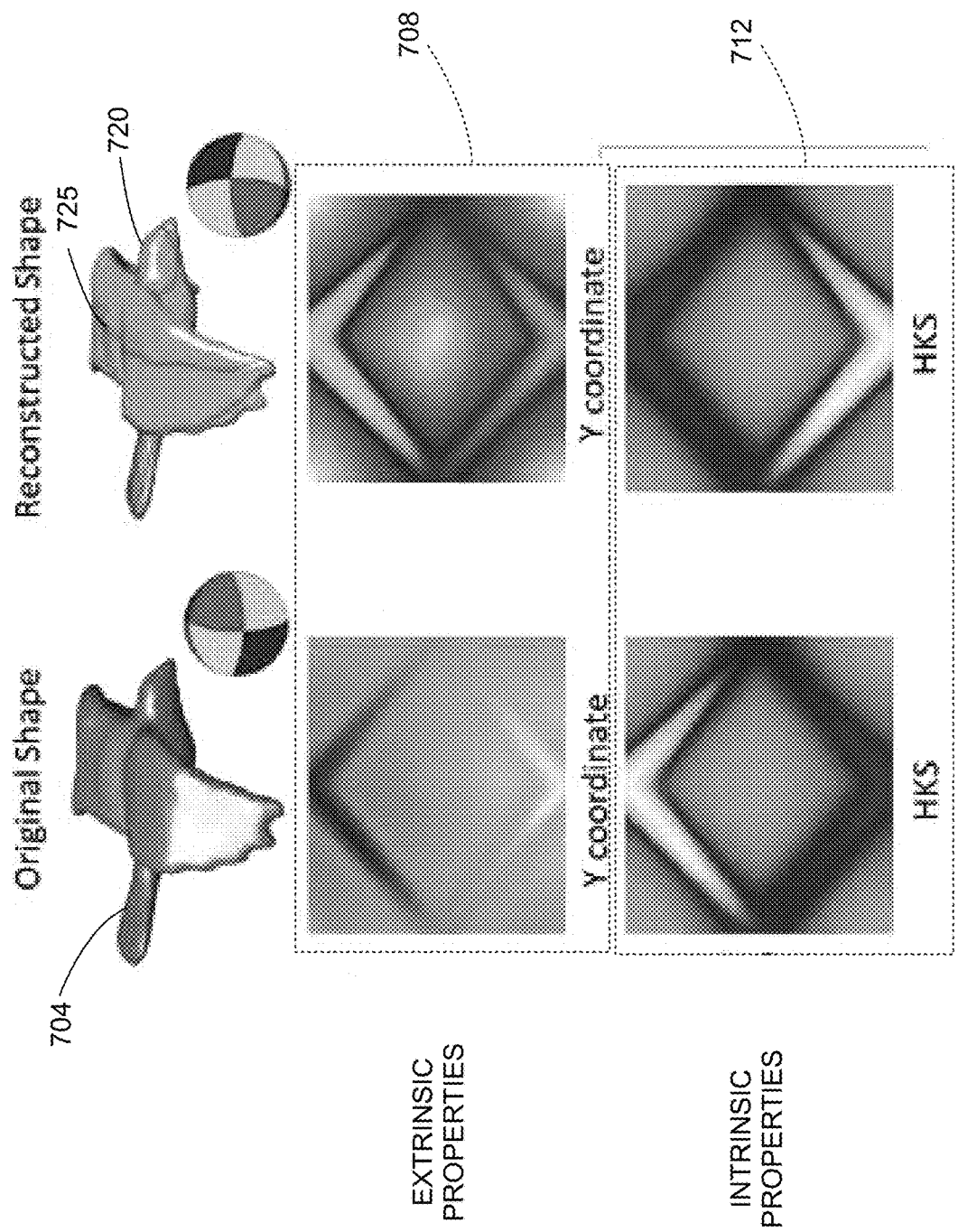
FIG. 7A is a diagram depicting a three-dimensional object model with corresponding two-dimensional geometry images that encode both extrinsic and intrinsic properties of the three-dimensional object model.

FIG. 7A illustrates the difference between intrinsic HKS and point coordinates which are extrinsic in the context of analyzing articulated shapes. In one embodiment, the system 100 uses the intrinsic HKS to generate additional geometry data for non-rigid shape analysis and uses the two extrinsic principal curvatures for rigid-shape analysis. In FIG. 7A the system 100 receives a model of a bird 704 and produces the geometry image 708 that describes extrinsic properties of the geometric structure of the bird 704. The bird 704 is an example of a non-rigid object with components, such as wings, that are expected to change angle from the pose that is depicted in FIG. 7A. The system 100 applies the HKS to the geometry image 708 to generate a second geometry image 712 that depicts the intrinsic properties of the model 704. FIG. 7A also depicts a reconstructed bird shape 720, which is reconstructed from geometry image with cut edges cut along lines 725. The middle and bottom rows show the geometry image encoding the y coordinates 708 and HKS 712, respectively of two spherical parameterizations (left and right). The two spherical parameterizations are symmetrically rotated by 180 degrees along the Y-axis. The geometry images for Y-coordinate display an axial as well as intensity flip. Whereas, the geometry images for HKS only display an axial flip. This is because HKS is an intrinsic shape signature (geodesics lines that connect points are preserved) whereas point coordinates on a shape surface are not. During the process 200, the system 100 uses the geometry image 712 with the intrinsic properties during training and inferencing to enable classification of other three-dimensional models of birds with a similar structure even if the angles of the wings change from the post depicted in FIG. 7A.

The process 200 continues with either or both of a training process (block 228) or inferencing process (block 232) for a convolutional neural network that uses the two-dimensional geometry images of the three-dimensional object as inputs. In the training process, the shape analysis system 150 stores the geometry images in association with an identifier for the object (e.g. "teddy bear" for the teddy bear 130 in FIG. 1 or a different identifier that enables automated searches for the object) in the training geometry image database 172. In general, the database 172 includes a large set of training geometry images for a diverse set of three-dimensional objects of interest for classification in the system 100 including both rigid and non-rigid objects. In more specialized embodiments, the training geometry image database 172 only stores sets of data for more specialized objects such as a database of geometry images for human hands in a system that is dedicated to detecting human hands for additional processing, such as in gesture-input systems.

In the system 100, the training database 172 also serves as an image search database that enables the shape analysis system 172 to return one of the stored geometry images in response to receiving a three-dimensional model of an object or geometry image of the object after completion of the training process. As described in more detail below, after completion of the training process the trained CNN 184 generates different one-dimensional output vectors in response to receiving the input geometry image. After completion of the training process, the trained CNN 184 generates the output vector for each geometry image in the training database 172 and the processor 154 stores the predetermined output vector in an a priori association with the corresponding geometry image in the database. As described below, during a later shape analysis operation that includes searching for an object, the system 100 can identify geometry images with predetermined output vectors stored in the training database 172 that have the closest vector distances to the output vector of a new geometry image that the trained CNN 184 generate during an inferencing operation.

Figure 7B:
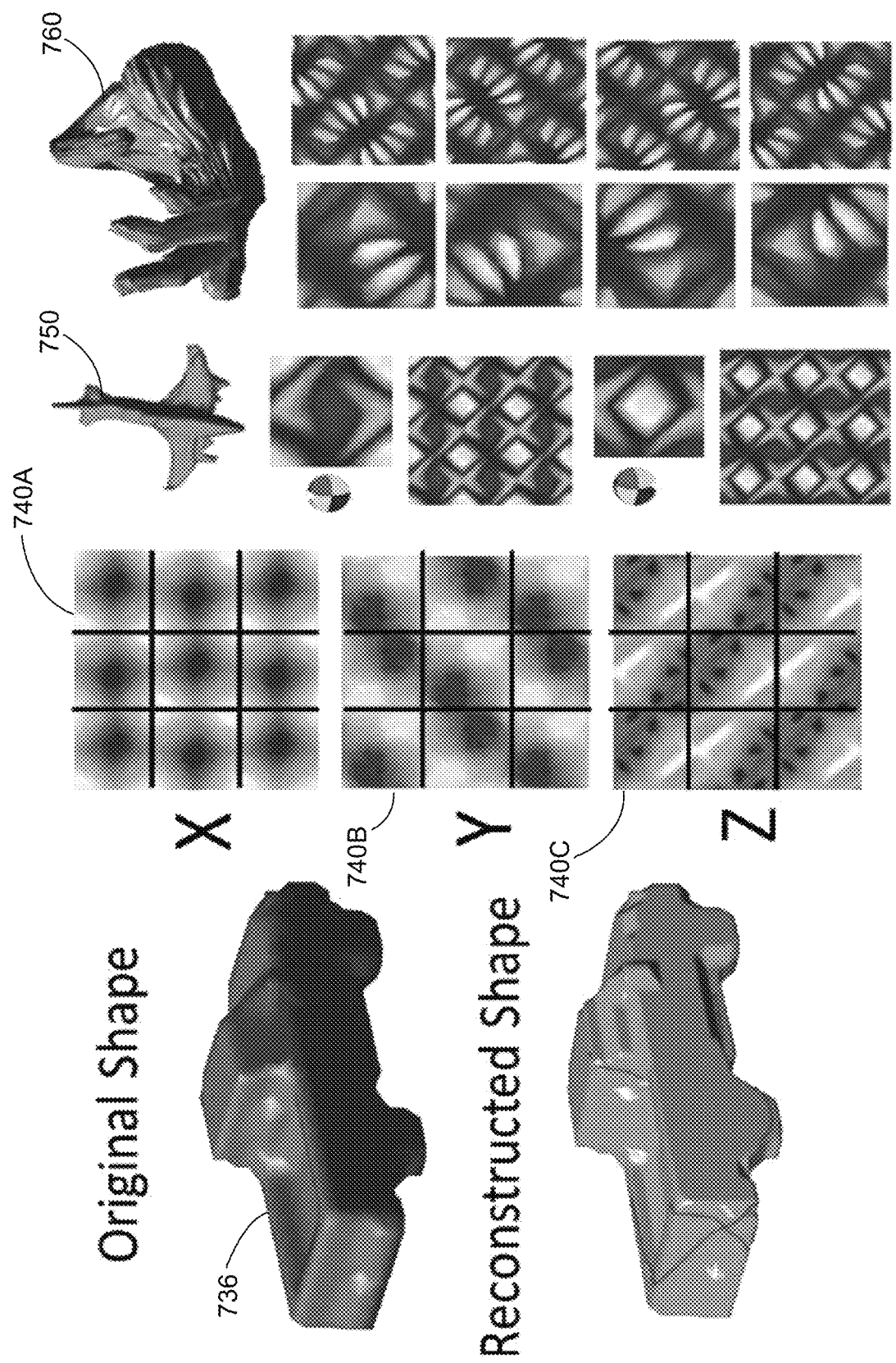
FIG. 7B is a diagram depicting three-dimensional object models with padded geometry images that are used for training and inferencing operations with a convolutional neural network in a machine learning framework.

In the training process, the shape analysis system 150 executes the CNN trainer 176 to provide geometry images from the database 172 to a CNN using, for example, gradient descent learning process, an autoencoder, or any other suitable training process that is otherwise known to the art. As described above, in some embodiments the system 100 generates multiple geometry images taken along different cuts of the spherical parameterization and subsequently processed to include extrinsic or intrinsic properties of the shape of the object in two-dimensional geometry image data. Furthermore, the system 100 generates padding of the geometry images to provide as inputs to the training process, which is to say that the system 100 copies the geometry image and provides an array of the geometry image as an input to the training process. FIG. 7B depicts three sets of padded geometry images 740A-740C that correspond to a single three-dimensional model of a pickup truck 736. The padded geometry image 740A is taken along a first cut labeled "X" in FIG. 7B. Similarly, the padded geometry images 740B and 740C are taken along different cuts "Y" and "Z", respectively. Each of the geometry images 740A-740C is formed from the same spherical parameterization and includes an encoding of the full three-dimensional structure of the object with either extrinsic or intrinsic properties of the object (e.g. pickup truck 736). The only differences are in the arrangements of the triangular octahedral faces within each of the geometry images, and the optional use of multiple versions of the same geometry image encoding improves the accuracy of CNNs in shape analysis functions. The padded geometry image 740A includes a total of nine (9) copies of the original geometry image that are arranged in a 3×3 grid, and the same padding is applied to the geometry images 740B and 740C. FIG. 7B depicts similar sets of geometry images from the training geometry image database 172 with padding for a rigid airplane model 750 and a non-rigid hand model 760.

In the inferencing process, the padding of the geometry images provides additional information to the CNN that this flat geometry image stems from a compact manifold, such as the closed sphere in the spherical parameterization where the sphere does not have edges, while most three-dimensional object models do have edges and are not compact manifolds. The spherical symmetry of the parametrization described herein allows the CNN to be implicitly informed about the genus-0 surface via padding. There are no edge and corner discontinuities if replicates of a geometry image are connected along each of the 4 edges of the image which are rotated by 180 degrees (or flipped once along the x-axis and y-axis each). This is due to spherical symmetry and orientation of edges in the derived octahedral parametrization. This is visually illustrated for the geometry images encoding the x, y, and z coordinates of the mesh model in FIG. 7B. No subsequent layer in the CNN is padded so as to not distort this information.

After completion of the training process, the shape analysis system 150 stores the trained CNN 184 in the memory 162. During the subsequent inference process of block 232 in the process 200, the shape analysis system 150 generates one or more geometry images with extrinsic and intrinsic properties in the same manner that is described above and uses a set of padded geometry images for a three-dimensional object to generate an from the trained CNN 184. As is known in the art, the trained CNN 184 generates an output from a set of output neurons in an output layer where the direct output is typically in the form of a one-dimensional vector of numeric weight values in a predetermined range (e.g. 0.0 to 1.0). In the shape analysis system 150, the processor 154 uses the inferencing subsystem 180 to perform a wide range of shape analysis operations based on the output vector from the trained CNN 184 to generate the final shape analysis output 188. The inferencing subsystem 180 in the shape analysis system 150 only requires two-dimensional geometry image input for a three-dimensional object to perform the shape analysis.

Object classification is one example of the shape analysis operation. In one non-limiting example, the shape analysis system 150 transmits a text or photographic identifier for the object 130 (e.g. "teddy bear") to the mobile electronic device 104 in response to the output vector from the CNN 184 that is generated from a geometry image input that is based on the three-dimensional mesh received from the mobile electronic device 104 or from a geometry image that the mobile electronic device 104 generates directly. The shape analysis system transmits a text identifier, two-dimensional picture stored in a database, or other suitable identifier to the mobile electronic device 104 to enable the mobile electronic device to identify the teddy bear 130 and a wide range of rigid and non-rigid objects in a machine learning framework.

In addition to direct object classification, the shape analysis system 150 can perform other shape analysis operations. In one configuration, the shape analysis system 150 returns a geometry image from the training database 172 that is associated with an output vector that most closely matches the output vector from the trained CNN 184 that is generated in response to a new geometry image during an inferencing process. For example, the camel 404 of FIG. 4 is stored in the training database 172 and the shape analysis system 150 associates the three-dimensional object model of the camel 404 (or more precisely, one or more intrinsic property geometry images of the non-rigid camel 404) with an output vector from the CNN 184 after completion of the training process. During a later inferencing process for a three-dimensional object model of another camel that is not exactly the same as the original camel mode, the shape analysis system 150 or the mobile electronic device 104 produces another two-dimensional geometry image as input to the trained CNN 184. One advantage of using the CNN 184 to generate a one-dimensional output vector instead of attempting to directly compare a new two-dimensional geometry image to a database 172 of previously generated geometry images is that the one-dimensional output vectors from the CNN 184 generated during both training and inference are substantially smaller and simpler to compare with each other in contrast to the larger and more complex two-dimensional geometry images. The shape analysis system 150 then performs a shape retrieval process from the training and search database 172 to retrieve the geometry image of the camel from the database 172 based on a Euclidean distance or a Manhattan distance between the output vector from the inferencing process that has a minimum Euclidean/Manhattan distance to the vector for the geometry image of the camel 404 that was stored in the database 172 during the training process.

In addition to retrieving the two-dimensional geometry image during a search operation, in some embodiments the shape analysis operation further includes regeneration of a three-dimensional object using the retrieved geometry shape, which is also referred to as a "shape creation" or "shape regeneration" process. As described above, the basic geometry image that encodes the shape of the three-dimensional object in a two-dimensional geometry image can also serve as the basis for a process that effectively reverses the processing described above with reference to blocks 212-220 to enable generation of a three-dimensional object model from the two-dimensional geometry image by reconstructing the octahedron, projecting the octahedron back to the spherical parameterization, and then reversing the spherical parameterization process to reproduce a three-dimensional object model. This process can be useful in various applications where the system 100 seeks to produce a three-dimensional graphical output that is easily understood by human users even though the stored geometry images in the database 172 are not encoded in a manner that is easily interpreted by human users. In the system 100, either the processor 154 in the shape analysis system 154 or the processor 112 in the mobile electronic device 104 regenerates a three-dimensional model from the retrieved two-dimensional geometry image. A visual display device, such as an LCD or OLED display screen, projector, holographic display, or other suitable visual display in the mobile electronic device 104 generates a visual output of the regenerated three-dimensional model.

While the process 200 describes some forms of shape analysis including object classification, shape retrieval, and shape regeneration, for illustrative purposes, the processes and systems described herein that generate two-dimensional geometry image representations of three-dimensional objects as inputs for training and inferencing using CNNs in a machine learning framework can of course be used in other applications that are not described in further detail herein. It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method using a two-dimensional (2D) image representation of three-dimensional (3D) geometric objects in a machine learning framework, comprising:
generating a single 2D geometry image based on data 3D image data corresponding to a 3D object model, wherein generating the single 2D geometry image includes:
performing an authalic spherical parametrization to map the three-dimensional object model to a surface of a sphere,
mapping the authalic spherical parameterization to an octahedron, and
cutting the octahedron to form the 2D geometry image from a plurality of faces of the octahedron; and
providing the single 2D geometry image as input to a shape analysis task to enable shape analysis of the 3D object model based only on information encoded in the single 2D geometry image in the machine learning framework.

2. The method of claim 1 further comprising:
generating the single 2D geometry image that encodes an extrinsic property of the 3D object model.

3. The method of claim 2 further comprising:
generating the single 2D geometry image that encodes an object shape extrinsic property of the 3D object model.

4. The method of claim 2 further comprising:
generating the single 2D geometry image that encodes a principal curvatures property of the 3D object model.

5. The method of claim 1 further comprising:
generating the single 2D geometry image that encodes an intrinsic property of the 3D object model.

6. The method of claim 5 further comprising:
generating the single 2D geometry image that encodes a Gaussian curvature intrinsic property of the 3D object model.

7. The method of claim 5 further comprising:
generating the single 2D geometry image that encodes a heat kernel signature intrinsic property of the 3D object model.

8. The method of claim 1, the shape analysis task further comprising:
a shape classification process in which the single 2D geometry image is provided as an input to a trained convolutional neural network (CNN) to enable classification of the three-dimensional object model based on the single 2D geometry image.

9. The method of claim 1, the shape analysis task further comprising:
a shape retrieval process in which the single 2D geometry image is provided as an input to a trained convolutional neural network (CNN) that generates an output vector; and
wherein the shape retrieval process includes retrieval of another 2D geometry image stored in a database based on a Euclidean distance or a Manhattan distance between the output vector and a predetermined output vector of the other 2D geometry image stored in the database.

10. The method of claim 9 further comprising:
performing a shape regeneration process using the retrieved 2D geometry image from the database to generate another three-dimensional object; and
generating a visual display of the other three-dimensional object.

11. A method using a two-dimensional (2D) image representation of three-dimensional (3D) geometric objects in a machine learning framework, comprising:
generating a single 2D geometry image corresponding to a 3D object model at least in part by performing an authalic spherical parametrization to map the three-dimensional object model to a surface of a sphere and generating the single 2D geometry image from the mapped three-dimensional object; and
providing the single geometry image as input to a shape analysis task to enable shape analysis of the 3D object model based only on information encoded in the single 2D geometry image in the machine learning framework.

12. The method of claim 11 further comprising:
generating the single 2D geometry image that encodes an extrinsic property of the 3D object model.

13. The method of claim 12 further comprising:
generating the single 2D geometry image that encodes an object shape extrinsic property of the 3D object model.

14. The method of claim 12 further comprising:
generating the single 2D geometry image that encodes a principal curvatures property of the 3D object model.

15. The method of claim 11 further comprising:
generating the single 2D geometry image that encodes an intrinsic property of the 3D object model.

16. The method of claim 15 further comprising:
generating the single 2D geometry image that encodes a Gaussian curvature intrinsic property of the 3D object model.

17. The method of claim 15 further comprising:
generating the single 2D geometry image that encodes a heat kernel signature intrinsic property of the 3D object model.

18. The method of claim 16 further comprising:
a shape classification process in which the single 2D geometry image is provided as an input to a trained convolutional neural network (CNN) to enable classification of the three-dimensional object model based on the single 2D geometry image.

19. A method using a two-dimensional (2D) image representation of three-dimensional (3D) geometric objects in a machine learning framework, comprising:
generating a single 2D geometry image corresponding to a 3D object model; and
providing the single geometry image as input to a shape analysis task to enable shape analysis of the 3D object model based only on information encoded in the single 2D geometry image in the machine learning framework the shape analysis task includes a shape retrieval process in which the single 2D geometry image is provided as an input to a trained convolutional neural network (CNN) that generates an output vector; and
wherein the shape retrieval process includes retrieval of another 2D geometry image stored in a database based on a Euclidean distance or a Manhattan distance between the output vector and a predetermined output vector of the other 2D geometry image stored in the database.

20. The method of claim 19 further comprising:
generating the single 2D geometry image that encodes an extrinsic property of the 3D object model.

* * * * *